US010230419B2

United States Patent
Bharadia et al.

(10) Patent No.: US 10,230,419 B2
(45) Date of Patent: *Mar. 12, 2019

(54) ADAPTIVE TECHNIQUES FOR FULL DUPLEX COMMUNICATIONS

(75) Inventors: Dinesh Bharadia, Stanford, CA (US); Jung-Il Choi, Santa Clara, CA (US); Mayank Jain, Sunnyvale, CA (US); Sachin Katti, Stanford, CA (US); Tae Min Kim, Stanford, CA (US); Philip Levis, San Francisco, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,072

(22) Filed: Nov. 9, 2011

(65) Prior Publication Data

US 2012/0201153 A1 Aug. 9, 2012

Related U.S. Application Data

(60) Provisional application No. 61/485,980, filed on May 13, 2011, provisional application No. 61/462,493, filed on Feb. 3, 2011.

(51) Int. Cl.
*H04B 1/525* (2015.01)
*H04B 1/18* (2006.01)
(Continued)

(52) U.S. Cl.
CPC .............. *H04B 1/525* (2013.01); *H04B 1/18* (2013.01); *H04B 1/56* (2013.01); *H04L 27/2626* (2013.01); *H04L 27/2647* (2013.01)

(58) Field of Classification Search
CPC ............ H04B 1/525; H04B 1/18; H04B 1/56; H04W 24/02; H04L 27/2626
See application file for complete search history.

(56) References Cited

U.S. PATENT DOCUMENTS

| 3,922,617 A | 11/1975 | Denniston et al. |
| 4,952,193 A | 8/1990 | Talwar |

(Continued)

FOREIGN PATENT DOCUMENTS

| EP | 0755141 A2 | 1/1997 |
| EP | 755141 A2 | 10/2005 |

(Continued)

OTHER PUBLICATIONS

PCT International Search Report and Written Opinion dated May 17, 2012 for PCT application No. PCT/US2012/023183.

(Continued)

*Primary Examiner* — Walter J Divito
*Assistant Examiner* — Anthony Luo
(74) *Attorney, Agent, or Firm* — Alston & Bird LLP

(57) ABSTRACT

In one aspect there is provided a method. The method may include receiving a first analog radio frequency signal including a signal of interest and an interference signal caused by a second analog radio frequency signal transmitted in full duplex over a channel from which the first analog transmission is received; adjusting at least one of the first analog radio frequency signal and a portion of the second analog radio frequency signal to enable at least one of a reduction or an elimination of the interference signal in an output analog radio frequency signal; combining the first analog radio frequency signal and the portion of the second analog radio frequency signal to generate the output analog radio frequency signal characterized by at least the reduction or the elimination of the interference signal included in the output analog radio frequency signal; and providing the output analog radio frequency signal. Related apparatus, systems, methods, and articles are also described.

19 Claims, 12 Drawing Sheets

(51) Int. Cl.
*H04B 1/56* (2006.01)
*H04L 27/26* (2006.01)

(56) References Cited

U.S. PATENT DOCUMENTS

| | | | |
|---|---|---|---|
| 5,212,827 A | 5/1993 | Meszko et al. | |
| 5,444,864 A | 8/1995 | Smith | |
| 5,691,978 A | 11/1997 | Kenworthy | |
| 5,734,967 A | 3/1998 | Kotzin et al. | |
| 5,790,658 A | 8/1998 | Yip et al. | |
| 5,930,301 A | 7/1999 | Chester et al. | |
| 6,215,812 B1 | 4/2001 | Young et al. | |
| 6,411,250 B1 | 6/2002 | Oswald et al. | |
| 6,539,204 B1 | 3/2003 | Marsh et al. | |
| 6,567,649 B2 | 5/2003 | Souissi | |
| 6,639,551 B2 | 10/2003 | Li et al. | |
| 6,725,017 B2 | 4/2004 | Blount et al. | |
| 6,745,018 B1 | 6/2004 | Zehavi et al. | |
| 6,965,657 B1 | 11/2005 | Rezvani et al. | |
| 7,336,940 B2* | 2/2008 | Smithson | 455/326 |
| 7,349,505 B2 | 3/2008 | Blount et al. | |
| 7,362,257 B2 | 4/2008 | Bruzzone et al. | |
| 7,426,242 B2 | 9/2008 | Thesling | |
| 7,564,396 B2 | 7/2009 | Van Veldhoven et al. | |
| 7,869,527 B2 | 1/2011 | Vetter et al. | |
| 8,055,235 B1 | 11/2011 | Gupta et al. | |
| 8,060,803 B2* | 11/2011 | Kim | H03M 13/1148 375/340 |
| 8,086,191 B2 | 12/2011 | Fukuda et al. | |
| 8,155,595 B2 | 4/2012 | Sahin et al. | |
| 8,175,535 B2 | 5/2012 | Mu | |
| 8,179,990 B2 | 5/2012 | Orlik et al. | |
| 8,218,697 B2 | 7/2012 | Guess et al. | |
| 8,331,477 B2 | 12/2012 | Huang et al. | |
| 8,351,533 B2 | 1/2013 | Shrivastava et al. | |
| 8,385,871 B2 | 2/2013 | Wyville | |
| 8,422,540 B1 | 4/2013 | Negus et al. | |
| 8,755,756 B1 | 6/2014 | Zhang et al. | |
| 8,995,410 B2 | 3/2015 | Balan et al. | |
| 9,042,838 B2 | 5/2015 | Braithwaite | |
| 9,054,795 B2 | 6/2015 | Choi et al. | |
| 9,065,519 B2 | 6/2015 | Cyzs et al. | |
| 9,077,421 B1 | 7/2015 | Mehlman et al. | |
| 9,124,475 B2 | 9/2015 | Li et al. | |
| 9,184,902 B2 | 11/2015 | Khojastepour et al. | |
| 2002/0064245 A1 | 5/2002 | McCorkle | |
| 2003/0031279 A1 | 2/2003 | Blount et al. | |
| 2003/0099287 A1 | 5/2003 | Arambepola | |
| 2003/0148748 A1 | 8/2003 | Shah | |
| 2004/0106381 A1* | 6/2004 | Tiller | H04B 17/11 455/73 |
| 2005/0078743 A1 | 4/2005 | Shohara | |
| 2005/0129152 A1 | 6/2005 | Hillstrom | |
| 2005/0159128 A1 | 7/2005 | Collins et al. | |
| 2005/0190870 A1 | 9/2005 | Blount et al. | |
| 2005/0254555 A1 | 11/2005 | Teague | |
| 2005/0282500 A1 | 12/2005 | Wang et al. | |
| 2006/0029124 A1 | 2/2006 | Grant et al. | |
| 2006/0030277 A1 | 2/2006 | Cyr et al. | |
| 2006/0058022 A1 | 3/2006 | Webster et al. | |
| 2006/0083297 A1 | 4/2006 | Yan et al. | |
| 2006/0209754 A1 | 9/2006 | Ji et al. | |
| 2007/0018722 A1 | 1/2007 | Jaenecke | |
| 2007/0105509 A1 | 5/2007 | Muhammad et al. | |
| 2007/0207747 A1 | 9/2007 | Johnson et al. | |
| 2007/0223617 A1 | 9/2007 | Lee et al. | |
| 2007/0249314 A1 | 10/2007 | Sanders et al. | |
| 2007/0274372 A1 | 11/2007 | Asai et al. | |
| 2008/0037801 A1 | 2/2008 | Alves et al. | |
| 2008/0089397 A1 | 4/2008 | Vetter et al. | |
| 2008/0107046 A1* | 5/2008 | Kangasmaa et al. | 370/278 |
| 2008/0131133 A1 | 6/2008 | Blunt et al. | |
| 2008/0192636 A1* | 8/2008 | Briscoe | H04L 47/10 370/236 |
| 2008/0219339 A1 | 9/2008 | Chrabieh et al. | |
| 2008/0219377 A1* | 9/2008 | Nisbet | 375/296 |
| 2009/0022089 A1* | 1/2009 | Rudrapatna | 370/328 |
| 2009/0034437 A1 | 2/2009 | Shin et al. | |
| 2009/0047914 A1 | 2/2009 | Axness et al. | |
| 2009/0115912 A1 | 5/2009 | Liou et al. | |
| 2009/0180404 A1 | 7/2009 | Jung et al. | |
| 2009/0186582 A1 | 7/2009 | Muhammad et al. | |
| 2009/0221231 A1 | 9/2009 | Weng et al. | |
| 2009/0303908 A1* | 12/2009 | Deb | H04W 28/18 370/310 |
| 2010/0014600 A1 | 1/2010 | Li et al. | |
| 2010/0014614 A1* | 1/2010 | Leach | H04B 1/7115 375/340 |
| 2010/0022201 A1* | 1/2010 | Vandenameele | 455/78 |
| 2010/0031036 A1 | 2/2010 | Chauncey et al. | |
| 2010/0056166 A1 | 3/2010 | Tenny | |
| 2010/0103900 A1 | 4/2010 | Yeh et al. | |
| 2010/0117693 A1 | 5/2010 | Lorg et al. | |
| 2010/0136900 A1 | 6/2010 | Seki | |
| 2010/0150033 A1 | 6/2010 | Zinser et al. | |
| 2010/0159837 A1* | 6/2010 | Dent | H04B 1/525 455/63.1 |
| 2010/0159858 A1 | 6/2010 | Dent et al. | |
| 2010/0215124 A1* | 8/2010 | Zeong | H04B 1/1036 375/316 |
| 2010/0226416 A1 | 9/2010 | Dent et al. | |
| 2010/0226448 A1 | 9/2010 | Dent | |
| 2010/0232324 A1* | 9/2010 | Radunovic et al. | 370/277 |
| 2010/0279602 A1 | 11/2010 | Larsson et al. | |
| 2010/0295716 A1 | 11/2010 | Yamaki et al. | |
| 2011/0013684 A1 | 1/2011 | Semenov et al. | |
| 2011/0026509 A1 | 2/2011 | Tanaka | |
| 2011/0149714 A1 | 6/2011 | Rimini et al. | |
| 2011/0171922 A1 | 7/2011 | Kim et al. | |
| 2011/0216813 A1 | 9/2011 | Baldemair et al. | |
| 2011/0222631 A1 | 9/2011 | Jong | |
| 2011/0243202 A1 | 10/2011 | Lakkis | |
| 2011/0256857 A1 | 10/2011 | Chen et al. | |
| 2011/0268232 A1 | 11/2011 | Park et al. | |
| 2011/0311067 A1 | 12/2011 | Harris et al. | |
| 2011/0319044 A1 | 12/2011 | Bornazyan | |
| 2012/0021153 A1 | 1/2012 | Bhandari et al. | |
| 2012/0063369 A1* | 3/2012 | Lin et al. | 370/279 |
| 2012/0063373 A1* | 3/2012 | Chincholi et al. | 370/281 |
| 2012/0147790 A1* | 6/2012 | Khojastepour et al. | 370/277 |
| 2012/0154249 A1* | 6/2012 | Khojastepour et al. | 343/893 |
| 2012/0155335 A1* | 6/2012 | Khojastepour et al. | 370/278 |
| 2012/0155336 A1* | 6/2012 | Khojastepour et al. | 370/278 |
| 2012/0140685 A1 | 7/2012 | Lederer et al. | |
| 2012/0201173 A1 | 8/2012 | Jain et al. | |
| 2013/0005284 A1 | 1/2013 | Dalipi | |
| 2013/0044791 A1 | 2/2013 | Rimini et al. | |
| 2013/0089009 A1 | 4/2013 | Li et al. | |
| 2013/0102254 A1 | 4/2013 | Cyzs et al. | |
| 2013/0114468 A1 | 5/2013 | Hui et al. | |
| 2013/0155913 A1 | 6/2013 | Sarca | |
| 2013/0166259 A1 | 6/2013 | Weber et al. | |
| 2013/0194984 A1 | 8/2013 | Cheng et al. | |
| 2013/0215805 A1 | 8/2013 | Honq et al. | |
| 2013/0225101 A1 | 8/2013 | Basaran et al. | |
| 2013/0253917 A1 | 9/2013 | Schildbach | |
| 2013/0301487 A1 | 11/2013 | Khandani | |
| 2013/0301488 A1 | 11/2013 | Hong et al. | |
| 2014/0126437 A1 | 5/2014 | Patil et al. | |
| 2014/0169236 A1 | 6/2014 | Choi et al. | |
| 2014/0206300 A1 | 7/2014 | Hahn et al. | |
| 2014/0219139 A1 | 8/2014 | Choi et al. | |
| 2014/0348018 A1 | 11/2014 | Bharadia et al. | |
| 2015/0156003 A1 | 6/2015 | Khandani | |
| 2015/0156004 A1 | 6/2015 | Khandani | |
| 2016/0226653 A1 | 8/2016 | Bharadia et al. | |
| 2016/0234005 A1 | 8/2016 | Hong et al. | |

(56) References Cited

U.S. PATENT DOCUMENTS

| | | |
|---|---|---|
| 2016/0266245 A1 | 9/2016 | Bharadia et al. |
| 2017/0264420 A1 | 9/2017 | Bharadia et al. |

FOREIGN PATENT DOCUMENTS

| | | |
|---|---|---|
| EP | 1959625 B1 | 2/2009 |
| EP | 2237434 A1 | 10/2010 |
| EP | 2267946 A2 | 12/2010 |
| JP | 2001-196994 A | 7/2001 |
| JP | 2004-56315 A | 2/2004 |
| RU | 2256985 C2 | 7/2005 |
| WO | WO 2009/106515 A1 | 9/2009 |
| WO | WO 2012/106262 A1 | 8/2012 |
| WO | WO 2012/106263 A1 | 8/2012 |
| WO | 2013/185106 A1 | 12/2013 |
| WO | 2014/093916 A1 | 6/2014 |
| WO | WO 2014/093916 A1 | 6/2014 |
| WO | WO 2014/121290 A1 | 8/2014 |
| WO | WO 2015/021481 A2 | 2/2015 |
| WO | WO 2015/048678 A1 | 4/2015 |
| WO | WO 2015/073905 A2 | 5/2015 |

OTHER PUBLICATIONS

PCT International Search Report and Written Opinion dated May 17, 2012 for PCT application No. PCT/US2012/023184.
International Search Report and Written Opinion for PCT Application No. PCT/US2013/075166 dated Apr. 22, 2014.
International Search Report and Written Opinion for PCT Application No. PCT/US2014/014726 dated Jun. 2, 2014.
Bharadia et al., "Full Duplex Radios" SIGOMM, Aug. 12-16, 2013, Hong Kong, China, Copyright 2013 ACM 978-1-4503-2056-6/6/13/08, 12 pages.
International Preliminary Report on Patentablility for PCT Application No. PCT/US2012/023184 dated Aug. 6, 2013, 5 pages.
International Preliminary Report on Patentablility for PCT Application No. PCT/US2012/023183 dated Aug. 6, 2013, 5 pages.
International Search Report for PCT Application No. PCT/US2013/044830, dated Sep. 26, 2013, 2 pages.
Written Opinion for PCT Application No. PCT/US2013/044830, dated Sep. 26, 2013, 4 pages.
International Preliminary Report on Patentablility for PCT Application No. PCT/US2013/044830, dated Dec. 18, 2014, 5 pages.
International Search Report and Written Opinion for PCT Application No. PCT/US2014/050584 dated Jan. 21, 2015, 11 pages.
International Search Report and Written Opinion for PCT Application No. PCT/US2014/065814 dated Feb. 19, 2015, 11 pages.
Non-Final Office Action for U.S. Appl. No. 13/293,069 dated Jul. 17, 2013, 13 pages.
Final Office Action for U.S. Appl. No. 13/293,069 dated Oct. 21, 2014, 18 pages.
Non-Final Office Action for U.S. Appl. No. 13/762,043 dated Nov. 17, 2014, 9 pages.
Non-Final Office Action for U.S. Appl. No. 13/913,323 dated Mar. 12, 2015, 11 pages.
Final Office Action for U.S. Appl. No. 13/913,323 dated Apr. 21, 2015, 5 pages.
Final Office Action for U.S. Appl. No. 13/762,043 dated Jun. 8, 2015, 11 pages.
Non-Final Office Action for U.S. Appl. No. 13/293,069 dated May 1, 2014.
Archer, et al., "Interface Contracts for TinyOS," IPSN '07: Proceedings of the 6th international conference on Information processing in sensor networks, pp. 158-165 (2007).
Aryafar, et al., "MIDU: Enabling MIMO Full Duplex," Proceedings of the 18th annual international conference on Mobile computing and networking, Mobicom '12, pp. 257-268, (2012).
Bahl, et al., "Reconsidering Wireless Systems With Multiple Radios," ACM SIG-COMM CCR, (2004).

Bahl, et al., "White Space Networking with Wi-Fi like Connectivity," SIGCOMM Comput. Commun. Rev., 39(4):27-38, (2009).
Bardwell, "Tech Report." [Retrieved from the Internet Dec. 3, 2016: <http://www.connect802.com/download/techpubs/2005/commercial_radios_E052315.pdf>].
Bicket, "Bit-rate Selection in Wireless Networks," Master's thesis, MIT, 2005.
Blefari-Melazzi, et al., "TCP Fairness Issues in IEEE 802.11 Networks: Problem Analysis and Solutions Based on Rate Control," IEEE Transactions on Wireless Communications, 6(4):1346-1355 (2007).
Bliss, et al., "Simultaneous Transmission and Reception for Improved Wireless Network Performance," Proceedings of the 2007 IEEE Workshop on Statistical Signal Processing, (2007).
Bortz, et al., "The Simplex Gradient and Noisy Optimization Problems," North Carolina State University, Department of Mathematics, Center for Research in Scientific Computation, (1998).
Briggs, et al., "Power Measurements of OFDM Signals," IEEE Symposium on Electromagnetic Compatibility, (2004).
Burlingame, et al., "An Analog CMOS High-Speed Continuous-Time FIR Filter," Solid-State Circuits Research Laboratory, Department of Electrical and Computer Engineering, University of California, Davis, CA, (2000).
Chandra, "A Case for Adapting Channel Width in Wireless Networks," ACM SIGCOMM, (2008).
Choi, et al., "Granting Silence to Avoid Wireless Collisions," Proceedings of the 18th International Conference on Network Protocols (ICNP), (2010).
Choi, et al., "IEEE 802.11e Contention-Based Channel Access (EDCF) Performance Evaluation," IEEE ICC (2003).
Choi, et al., "The Case for a Network Protocol Isolation Layer," Sensys '09: Proceedings of the 7th ACM Conference on Embedded networked sensor systems (SenSys), pp. 267-280, (2009).
Chu, et al., "The Design and Implementation of a Declarative Sensor Network System," Proceedings of the 5th international conference on Embedded networked sensor systems, (2007).
Coffman, et al., "Channel Fragmentation in Dynamic Spectrum Access Systems—a Theoretical Study," ACM SIGMETRICS, (2010).
Culler, et al., "Towards a Sensor Network Architecture: Lowering the Waistline," Proceedings of the Tenth Workshop on Hot Topics in Operating Systems (HotOS-X), (2005).
Ding, "Digital Predistortion of Power Amplifiers for Wireless Applications," Ph.D Thesis, School of Electrical and Computer Engineering, Georgia Institute of Technology, (Mar. 2004).
Duarte, "Experiment-driven Characterization of Full-Duplex Wireless Systems," CoRR, abs/1107.1276, (2011).
Duarte, et al., "Full-Duplex Wireless Communications Using Off-The-Shelf Radios: Feasibility and First Results," Forty-Fourth Asilomar Conference on Signals, Systems, and Components, (2010).
Ettus Research, UHD Daughterboard Application Notes. [Retrieved from the Internet Dec. 8, 2016: <http://files.ettus.com/uhd_docs/manual/html/dboards.html>].
Ettus Research, Universal Software Radio Peripheral (USRP). [Retrieved from the Internet Dec. 3, 2016: <http://www.ettus.com>].
Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).
Everett, et al., "Passive Self-Interference Suppression for Full-Duplex Infrastructure Nodes," CoRR, abs/1302.2185, (2013).
FCC, Table of Frequency Allocations. [Retrieved from the Internet Dec. 3, 2016: <http://transition.fcc.gov/oet/spectrum/table/fcctable.pdf>].
Fear, et al., "Enhancing breast tumor detection with near-field imaging," Microwave Magazine, IEEE, 3(1):48-56, (2002).
Gember, et al., "a Comparative Study of Handheld and Non-Handheld Traffic in Campus Wi-Fi Networks," Passive and Active Measurement Conf., (2011).
Gheorma, et al., "Rf Photonic Techniques for Same Frequency Simultaneous Duplex Antenna Operation," IEEE Photonics Technology Letters, 19(13): 1014-1016, (2007).

(56) References Cited

OTHER PUBLICATIONS

Gill, Slide Presentation: "RF performance of mobile terminals—a challenge for the industry," Cambridge Wireless Radio Technology Special Interest Group (SIG), (2011).
Gizmodo, "IPhone 4 Antenna-Gate," (2011). [Retrieved from the Internet Dec. 3, 2016: <http://gizmodo.com/5846638/giz-explains-whats-so-smart-about-the-iphone-4ss-antenna>].
Gnawali, et al., "Collection Tree Protocol," Proceedings of the 7th ACM Conference on Embedded Networked Sensor Systems (SenSys), pp. 1-14 (2009).
Goldsmith, "Wireless Communications," Cambridge University Press, (2004).
Gollakota, et al., "They Can Hear Your Heartbeats: Non-Invasive Security for Implantable Medical Devices," SIGCOMM Comput. Commun. Rev., 41(4), (Aug. 2011).
Gollakota, et al., "ZigZag Decoding: Combating Hidden Terminals in Wireless Networks," SIGCOMM '08: Proceedings of the ACM SIGCOMM 2008 Conference on Data Communications, pp. 159-170, (2008).
Gummadi, et al., "Understanding and Mitigating the Impact of RF Interference on 802.11 Networks," Proceedings of the 2007 conference on Applications, technologies, architectures, and protocols for computer communications (SIGCOMM), (2007).
Halperin, et al., "Taking the Sting out of Carrier Sense: Interference Cancellation for Wireless LANs." MobiCom '08: Proceedings of the 14th ACM international conference on Mobile computing and networking, pp. 339-350, (2008).
Harashima, "Matched-Transmission Technique for Channels With Intersymbol Interference," IEEE Transactions on Communications, COM-20:774-780, (1972).
Hong, et al, "DOF: A Local Wireless Information Plane," ACM SIGCOMM, (2011).
Hua, et al., "A method for Broadband Full-Duplex Mimo Radio," IEEE Signal Processing Letters, 19(12):793-796, (Dec. 2012).
Huang, "Optimal Transmission Strategies for Dynamic Spectrum Access in Cognitive Radio Networks," IEEE Transactions on Mobile Computing, 8(12): 1636-1648, (2009).
Huyer, et al., "SNOBIT—Stable Noisy Optimization by Branch and Fit," ACM Trans. Math. Softw., 35:9:1-9:25, (Jul. 2008).
Intersil Corp, "Qhx220 Active Isolation Enhancer and Interference Canceller." [Retrieved from the Internet Dec. 6, 2016: <http://www.intersil.com/content/dam/Intersil/documents/qhx2/qhx220.pdf>].
Iyer, et al., "Specnet: Spectrum Sensing Sans Frontiers," USENIX NSDI, (2011).
Jamieson, et al., "PPR: Partial Packet Recovery for Wireless Networks," Proceedings of the 2007 conference on Applications, technologies, architectures, and protocols for computer communications (SIGCOMM), (2007).
Jiang, et al., "An Architecture for Energy Management in Wireless Sensor Networks," Proceedings of the International Workshop on Wireless Sensornet Architecture (WWSNA), (2007).
Jung, et al., "A Reconfigurable Carrier Leakage Canceler for UHF RFID Reader Front-Ends," IEEE Transactions on Circuits and Systems I: Regular Papers, 58(1):70-76, (Jan. 2011).
Khojastepour, et al., "The Case for Antenna Cancellation for Scalable Full Duplex Wireless Communications," ACM HOTNETS, (2011).
Kim, et al., "Co-Channel Interference Cancellation Using Single Radio Frequency and Baseband Chain," IEEE Transactions on Communications, 58(7):2169-2175, (2010).
Kim, et al., "Flush: A Reliable Bulk Transport Protocol for Multihop Wireless Networks," In Proceedings of the Fifth ACM Conference on Embedded networked sensor systems (SenSys), (2007).
Klues, et al., "Integrating Concurrency Control and Energy Management in Device Drivers," Proceedings of twenty-first ACM SIGOPS symposium on Operating systems principles (SOSP), (2007).
Knox, "Single Antenna Full Duplex Communications using a Common Carrier," 2012 IEEE 13th Annual Wireless and Microwave Technology Conference (WAMICON), pp. 1-6, (2012).
Lakshminarayanan, et al., "Rfdump; An Architecture for Monitoring the Wireless Ether," ACM CoNEXT, (2009).
Lamprecht, et al., "Passive Alignment of Optical Elements in a Printed Circuit Board," Electric Components and Technology Conference, (2006).
Lee, et al., "Improving Wireless Simulation Through Noise Modeling," Proceedings of the 6th international conference on Information processing in sensor networks (IPSN), pp. 21-30, (2007).
Leith, et al., "TCP Fairness in 802.11e WLANs," IEEE Communications Letters, 9(12), (2005).
Levis, et al., "T2: A Second Generation OS For Embedded Sensor Networks," Technical Report TKN-05-007, Telecommunication Networks Group, Technische Universitat Berlin, (2005).
Liang, et al., "Sensing-Throughput Tradeoff for Cognitive Radio Networks," IEEE Transactions on Wireless Communications, 7(4): 1326-1337, (2008).
Liang, et al., "Surviving Wi-Fi Interference in Low Power Zigbee Networks," Proceedings of the Eighth ACM Conference on Embedded Networked Sensor Systems (SenSys), (2010).
Lin, et al., "Data Discovery and Dissemination with DIP," Proceedings of the 7th international conference on Information processing in sensor networks (IPSN), pp. 433-444, (2008).
Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).
Maxim Integrated, Power Amplifier Data-sheet. [Retrieved from the Internet Dec. 6, 2016: <http://datasheets.maximintegrated.com/en/ds/MAX2828-MAX2829.pdf>].
Mini-Circuits, Power Amplifier Data-sheet. [Retrieved from the Internet Dec. 6, 2016: <http://www.minicircuits.com/pdfs/PGA-105+.pdf>].
Mini-Circuits, Power Amplifier Data-sheet. [Retrieved from the Internet Dec. 6, 2016: <http://www.minicircuits.com/pdfs/ZHL-30W-262+.pdf>].
Morgan, et al, "A Generalized Memory Polynomial Model for Digital Predistortion of RF Power Amplifiers," IEEE Transactions on Signal Processing, 54(10):3852-3860, (2006).
National Instruments, N1 5781 Datasheet, (2011). [Retrieved from the Internet Dec. 6, 2016: <http://sine.ni.com/ds/app/doc/p/id/ds-212/lang/en>].
National Instruments, NI PXIe-8133 User Manual, (Jul. 2012). [Retrieved from the Internet Dec. 13, 2016: <www.ni.com/pdf/manuals/372870d.pdf>].
National Instruments, White Paper: "Understanding Dynamic Hardware Specifications," (Mar. 2010).
Palazzi, et al., "A RIO-Like Technique for Interactivity Loss-Avoidance in Fast-Paced Multiplayer Online Games," ACM Computers in Entertainment, (2005).
Peregrine Semiconductor, PE 47303 Data-sheet. [Retrieved from the Internet Dec. 6, 2016: <http://www.psemi.com/pdf/datasheets/pe43703ds.pdf>].
Polastre, et al., "A Unifying Link Abstraction for Wireless Sensor Networks," SenSys '05: Proceedings of the 3rd international conference on Embedded networked sensor systems, pp. 76-89, (2005).
Poston, et al., "Discontiguous OFDM Considerations for Dynamic Spectrum Access in Idle TV Channels," IEEE DySPAN, (2005).
Radunović, et al., "Efficiency and Fairness in Distributed Wireless Networks Through Self-Interference Cancellation and Scheduling," Technical Report MSR-TR-2009-27, Microsoft Research, (2009).
Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).
Rahul, et al., "Learning to Share: Narrowband-Friendly Wideband Networks," ACM SIGCOMM, (2008).
Rice University, WARP Project. [Retrieved from the Internet Dec. 8, 2016: <http://warp.rice.edu>].
Rohde & Schwarz, "Rohde & Schwarz FSW Signal and Spectrum Analyzer User Manual," (2016). [Retrieved from the Internet Dec. 10, 2016: <https://cdn.rohde-schwarz.com/pws/dl_downloads/dl_common_library/dl_manuals/gb_1/f/fsw_1/FSW_UserManual_en_26.pdf>].

(56) References Cited

OTHER PUBLICATIONS

Rohde & Schwarz, "Rohde & Schwarz SMBV 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_OperatingManual_en_16.pdf>].
Sahai, et al., "On the Impact of Phase Noise on Active Cancellation in Wireless Full-Duplex," CoRR, abs/1212.5462, (2012).
Sahai, et al., "Spectrum Sensing: Fundamental limits," draft chapter for a Springer Book: Cognitive Radios: System Design Perspective, (Jun. 2009).
Sen, et al., "AccuRate: Constellation Based Rate Estimation in Wireless Networks," Proceedings of the Seventh USENIX Symposium on Networked Systems Design and Implementation (NSDI), (2010).
Sen, et al., "CSMA/CN: Carrier Sense Multiple Access with Collision Notification," Proceedings of the 16th annual international conference on Mobile computing and networking (MobiCom), pp. 25-36, (2010).
Shen, et al., "Channel Estimation in OFDM Systems," Application Note, Freescale Semiconductor, (2006).
Srinivasan, et al., "An Empirical Study of Low-Power Wireless," ACM Transactions on Sensor Networks, 6(2):1-49, (2010).
Srinivasan, et al., "RSSI is Under Appreciated," Proceedings of the Third Workshop on Embedded Networked Sensors (EmNets), (2006).
Srinivasan, et al., "Some Implications of Low Power Wireless to IP Networking," Proceedings of the Fifth Workshop on Hot Topics in Networks (HotNets-V), (Nov. 2006).
Srinivasan, et al., "The κ-Factor: Inferring Protocol Performance Using Inter-Link Reception Correlation," Proceedings of the 16th annual international conference on Mobile computing and networking (MobiCom), (2010).
Srinivasan, et al., The β-factor: Measuring Wireless Link Burstiness, Proceedings of the Sixth ACM Conference on Embedded Networked Sensor Systems, (Nov. 2008).
Tan, et al., "Fine Grained Channel Access in Wireless LAN," ACM SIGCOMM, (2010).
Tan, et al., "Spectrum Virtualization Layer," MSR Tech Report, (2011). [Retrieved from the Internet Dec. 8, 2016: <http://research.microsoft.com/apps/pubs/default.aspx?id=154410>].
Tavakoli, et al., "A Declarative Sensornet Architecture," Proceedings of the International Workshop on Wireless Sensornet Architecture (WWSNA), (2007).
Tomlinson, "New Automatic Equaliser Employing Modulo Arithmetic," Electronic Letters, 7(5/6):138-139, (1971).
Tourrilhes, "Fragment Adaptive Reduction: Coping with Various interferers in radio unlicensed bands," IEEE IC, (2001).
Vutukuru, et al., "Cross-Layer Wireless Bit Rate Adaption," SIGCOMM Comput. Commun. Rev., 39(4):3-14, (2009).
Weingarten, et al., "The Capacity Region of the Gaussian Multiple-Input Multiple-Output Broadcast Channel," IEEE Transactions on Information Theory, 52(9):3936-3964, (2006).
Wi-Fi Alliance, WiFi Direct Industry White Paper,(2010). [Retrieved from the Internetm Dec. 13, 2016: <http://www.wi-fi.org/discover-wi-fi/wi-fi-direct>].
Winter, et al., "RPL: IPv6 Routing Protocol for Low power and Lossy Networks," IETF Internet draft (Work in Progress), (Jul. 2010). [Retrieved from the Internet Dec. 8, 2016: <https://tools.ietf.org/id/draft-ietf-roll-rpl-11.txt>].
Wischik, et al., "Design, implementation and evaluation of congestion control for multipath TCP," USENIX NSDI, (2011).
XILINX, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].
XILINX, UG193: XtremeDSP User Guide, (Jan. 26, 2012). [Retrieved from the Internet Dec. 6, 2016: <https://www.xilinx.com/support/documentation/user_guides/ug193.pdf>].
Yang, et al., "Supporting Demanding Wireless Applications with Frequency-agile Radios," USENIX NSDI, (2010).
Yang, et al., "The Spaces Between Us: Sensing and Maintaining Boundaries in Wireless Spectrum Access," ACM MOBICOM, (2010).
Yoo, et al., "On the Optimality of Multiantenna Broadcast Scheduling Using Zero-Forcing Beamforming," IEEE Journal on Selected Areas in Communications, 24(3):528-541, (2006).
Yuan, et al., "KNOWS: Kognitiv Networking Over White Spaces," IEEE DySPAN, (2007).
Zhang, et al., "Gain/Phase Imbalance-Minimization Techniques for LINC Transmitters," IEEE Transactions on Microwave Theory and Techniques, 49(12):2507-2516, (2001).
Chinese Application No. 201380041721.0, First Office Action dated Nov. 18, 2015.
EPO Application No. 20130801200, Supplementary European Search Report dated Feb. 4, 2016.
PCT International Preliminary Report on Patentablility for application PCT/US2013/075166 dated Jun. 16, 2015.
PCT International Preliminary Report on Patentablility for application PCT/US2014/014726 dated Aug. 4, 2015.
PCT International Preliminary Report on Patentablility for application PCT/US2014/050584 dated Feb. 9, 2016.
PCT International Preliminary Report on Patentablility for application PCT/US2014/058117 dated Mar. 29, 2016.
PCT International Preliminary Report on Patentablility for application PCT/US2014/065814 dated May 17, 2016.
PCT International Search Report and Written Opinion of the International Searching Authority for application PCT/US2012/023183 dated May 17, 2012.
PCT International Search Report and Written Opinion of the International Searching Authority for application PCT/US2014/058117 dated Dec. 30, 2014.
U.S. Appl. No. 13/293,069, Final Office Action dated Jun. 8, 2016.
U.S. Appl. No. 13/293,069, Non-Final Office Action dated Sep. 21, 2015.
U.S. Appl. No. 13/762,043, Notice of Allowance dated Nov. 9, 2015.
U.S. Appl. No. 13/913,323, Notice of Allowance dated Feb. 12, 2016.
U.S. Appl. No. 13/913,323, Notice of Allowance dated Oct. 16, 2015.
U.S. Appl. No. 13/913,323, Notice of Allowance dated Nov. 5, 2015.
U.S. Appl. No. 13/913,323, Notice of Allowance dated Nov. 13, 2015.
U.S. Appl. No. 14/456,807, Non-Final Office Action dated Mar. 4, 2016.
Adib et al., "See Through Walls with Wi-Fi!," Proceedings of the ACM SIGCOMM 2013 conference on SIGCOMM, SIGCOMM '13, pp. 75-86, ACM, New York, NY, USA, (2013).
Bharadia, "Full Duplex Backscatter," Proceedings of the 12th ACM Workshop on Hot Topics in Networks, 7 pages, ACM, (2013).
Bindu et al., "Active microwave imaging for breast cancer detection," Progress In Electromagnetics Research, vol. 58: 149-169, (2006).
Boyd, "Sequential Convex Programming." [Retrieved from the Internet Oct. 26, 2016: http://www.stanford.edu/class/ ee364b/lectures/seq_slides.pdf].
Cavoukian, "Whole Body Imaging in Airport Scanners: Building in Privacy by Design," Information and Privacy Commissioner of Ontario, Mar. 2009. [Retrieved from the Internet Oct. 25, 2016: https://www.ipc.on.ca/wp-content/uploads/ .../wholebodyimaging.pdf].
Duarte et al., "Experiment-driven Characterization of Full-Duplex Wireless Systems," (2011). [Retrieved from the Internet Oct. 25, 2016: https://arxiv.org/abs/1107.1276].
Ekanadham, "Continuous Basis Pursuit and Its Applications," PhD thesis, New York, NY, USA, AAI3546394, (2012).
Erceg et al., "TGn channel models," Tech. Rep. IEEE P802.11, Wireless LANs, Garden Grove, Calif, USA, (2004).
FDA, "Medical Imaging," [Retrieved from the Internet Oct. 25, 2016: http://www.fda.gov/Radiation-EmittingProducts/RadiationEmittingProductsandProcedures/MedicalImaging/MedicalX-Rays/ucm115317.htm].

(56) References Cited

OTHER PUBLICATIONS

Fear et al., "Confocal Microwave Imaging for Breast Cancer Detection: Localization of Tumors in Three Dimensions," IEEE Transactions on Biomedical Engineering, 49(8):812-822, (2002).

Fear et al., "Microwave Detection of Breast Cancer," IEEE Transactions on Microwave Theory and Techniques, 48(11):1854-1863, (2000).

Fleury et al., "Channel Parameter Estimation in Mobile Radio Environments Using the SAGE Algorithm," IEEE Journal on Selected Areas in Communications, 17(3):434-450, (1999).

Guo et al., "Microwave Imaging via Adaptive Beamforming Methods for Breast Cancer Detection," Progress In Electromagnetics Research, vol. 1, 350-353, (2005).

Hong et al., "Picasso: Flexible RF and Spectrum Slicing," In Proceedings of the ACM SIGCOMM 2012 conference on Applications, technologies, architectures, and protocols for computer communication, SIGCOMM '12, pp. 283-284, ACM, Helsinki, Finland, (2012).

Italian National Research Council, "Dielectric Properties of Body Tissues." [Retrieved from the Internet Oct. 25, 2016: http://niremf.ifac.cnr.it/tissprop/].

Jain et al., "Practical, Real-time, Full Duplex Wireless," MobiCom '11, pp. 301-312, ACM, New York, NY, USA, (2011).

Sundstrom et al., "Power Dissipation Bounds for High-Speed Nyquist Analog-to-Digital Converters," IEEE Transactions on Circuits and Systems I: Regular Papers, 56(3):509-518, (2009).

Surowiec et al., "Dielectric Properties of Breast Carcinoma and the Surrounding Tissues," IEEE Transactions on Biomedical Engineering, 35(4):257-263, (1988).

Tibshirani, "Regression shrinkage and selection via the lasso," Journal of the Royal Statistical Society, Series B (Methodological), pp. 267-288 (1996).

Tse et al., "Fundamentals of Wireless Communications," Aug. 13, 2004. [Retrieved from the Internet Oct. 25, 2016: www.eecs.berkeley.edu/~dtse/main.pdf].

Wikipedia, "Star Trek Tricoder," [Retrieved from the Internet Oct. 26, 2016: http://en.wikipedia.org/wiki/Tricorder].

Xiong et al., "ArrayTrack: A Fine-Grained Indoor Location System" In Proceedings of the 10th USENIX conference on Networked Systems Design and Implementation, nsdi'13, pp. 71-84, USENIX Association, Berkeley, CA, USA, (2013).

Zhang et al., "A novel method for microwave breast cancer detection," Progress In Electromagnetics Research, vol. 83: 413-434, (2008).

U.S. Appl. No. 13/293,069, Final Office Action dated May 2, 2017.
U.S. Appl. No. 13/293,069, Non-Final Office Action dated Jan. 6, 2017.
U.S. Appl. No. 13/293,069, Advisory Action dated Aug. 29, 2017.
U.S. Appl. No. 13/293,069, Notice of Allowance dated Sep. 27, 2017.
U.S. Appl. No. 13/293,069, Notice of Allowance dated Oct. 6, 2017.
U.S. Appl. No. 14/456,807, Non-Final Office Action dated Oct. 25, 2017.
U.S. Appl. No. 15/025,256, Non-Final Office Action dated Oct. 19, 2017.
U.S. Appl. No. 15/133,175, Non-Final Office Action dated Sep. 21, 2017.
U.S. Appl. No. 14/456,807, Non-Final Office Action dated Sep. 21, 2018.
U.S. Appl. No. 14/456,807, Notice of Allowance dated Jun. 6, 2018.
U.S. Appl. No. 15/025,256, Notice of Allowance dated May 21, 2018.
U.S. Appl. No. 15/025,256, Notice of Allowance dated Sep. 13, 2018.
U.S. Appl. No. 15/133,175, Final Office Action dated May 10, 2018.
U.S. Appl. No. 15/133,175, Notice of Allowance dated Nov. 28, 2018.

* cited by examiner

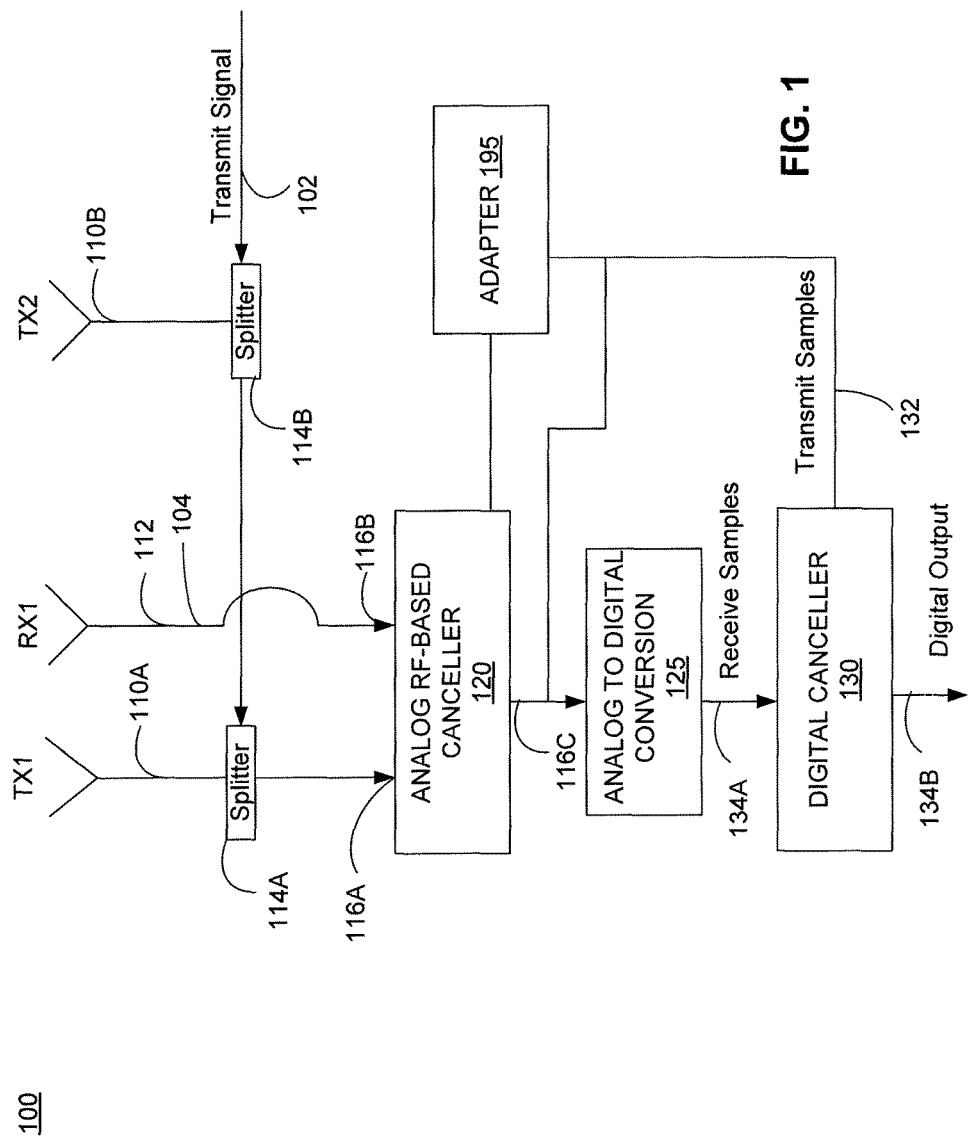

ADAPTIVE TECHNIQUES FOR FULL DUPLEX COMMUNICATIONS

CROSS-REFERENCE TO RELATED APPLICATIONS

This application claims the benefit of U.S. Provisional Patent Application Ser. No. 61/485,980, filed on May 13, 2011, and entitled "Adaptive Techniques For Full-Duplex Wireless," and U.S. Provisional Patent Application Ser. No. 61/462,493, filed on Feb. 3, 2011, and entitled "Single Channel Full Duplex Wireless Communications," both of which are incorporated by reference herein in their entirety.

STATEMENT OF GOVERNMENT SPONSORED SUPPORT

This invention was made with Government support under contract 0615308 awarded by NSF. The Government has certain rights in this invention.

FIELD

The subject matter described herein relates to wireless communications.

BACKGROUND

Wireless systems generally operate in half duplex. For example, a radio configured for half duplex may communicate with another device by transmitting or receiving, but the radio does not simultaneously transmit and receive. Unlike half duplex, a device configured to communicate in full duplex may simultaneously transmit and receive, but the transmit and receive are done over different frequencies. For example, a full duplex cell phone uses a first frequency channel for transmission and a second frequency channel for reception. Without different transmit and receive frequency channels, the full duplex radio, such as the cell phone, would suffer interference from its own transmission. Specifically, the radio would interfere with itself because the radio's transmission would also be received at the radio's receiver causing so-called "self-interference." In short, devices, such as cell phones, wireless user equipment, and the like, use different transmit frequency channels and receive frequency channels to avoid unwanted self-interference.

SUMMARY

The subject matter disclosed herein provides methods and apparatus, including computer program products for adaptive tuning of full duplex communications.

In one aspect there is provided a method. The method may include receiving a first analog radio frequency signal including a signal of interest and an interference signal caused by a second analog radio frequency signal transmitted in full duplex over a channel from which the first analog transmission is received; adjusting at least one of the first analog radio frequency signal and a portion of the second analog radio frequency signal to enable at least one of a reduction or an elimination of the interference signal in an output analog radio frequency signal; combining the first analog radio frequency signal and the portion of the second analog radio frequency signal to generate the output analog radio frequency signal characterized by at least the reduction or the elimination of the interference signal included in the output analog radio frequency signal; and providing the output analog radio frequency signal.

In some implementations, the above-noted aspects may further include additional features described herein including one or more of the following. At least one of the first analog radio frequency signal and the portion of the second analog radio frequency signal may be adjusted based on an optimization. The optimization may include gradient descent. At least one of an offset and an amplitude may be adjusted based on a parameter characterizing the output analog radio frequency signal. The parameter may include a measurement of a received signal strength of the output analog radio frequency signal. At least one of the offset and the amplitude may be adjusted to form a cancellation signal to combine with the at least one of the first analog radio frequency signal and the portion of the second analog radio frequency signal. At least one of an offset and an amplitude may be adjusted to optimize a received signal strength indicator of output analog radio frequency signal. The interference signal in the first analog radio frequency signal may be reduced based on a plurality of antennas positioned to enable destructive interference of the interference signal. The portion of the second analog radio frequency signal may be inverted with respect to the first analog radio frequency signal before the combining of the first analog radio frequency signal and the portion of the second analog radio frequency signal. At least one of the first analog radio frequency signal and the portion of the second analog radio frequency signal may be inverted at a balun. The output analog radio frequency signal may be converted to a digital output. A portion of the digital output may be cancelled, based on a frequency domain estimate of the radio frequency channel, to further reduce the interference signal. The second analog radio frequency signal may be transmitted in full duplex over the channel from which the first analog transmission is received.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

In the drawings,

FIG. 1 depicts an example of a system configured in accordance with some exemplary embodiments described herein;

Figure 2A:
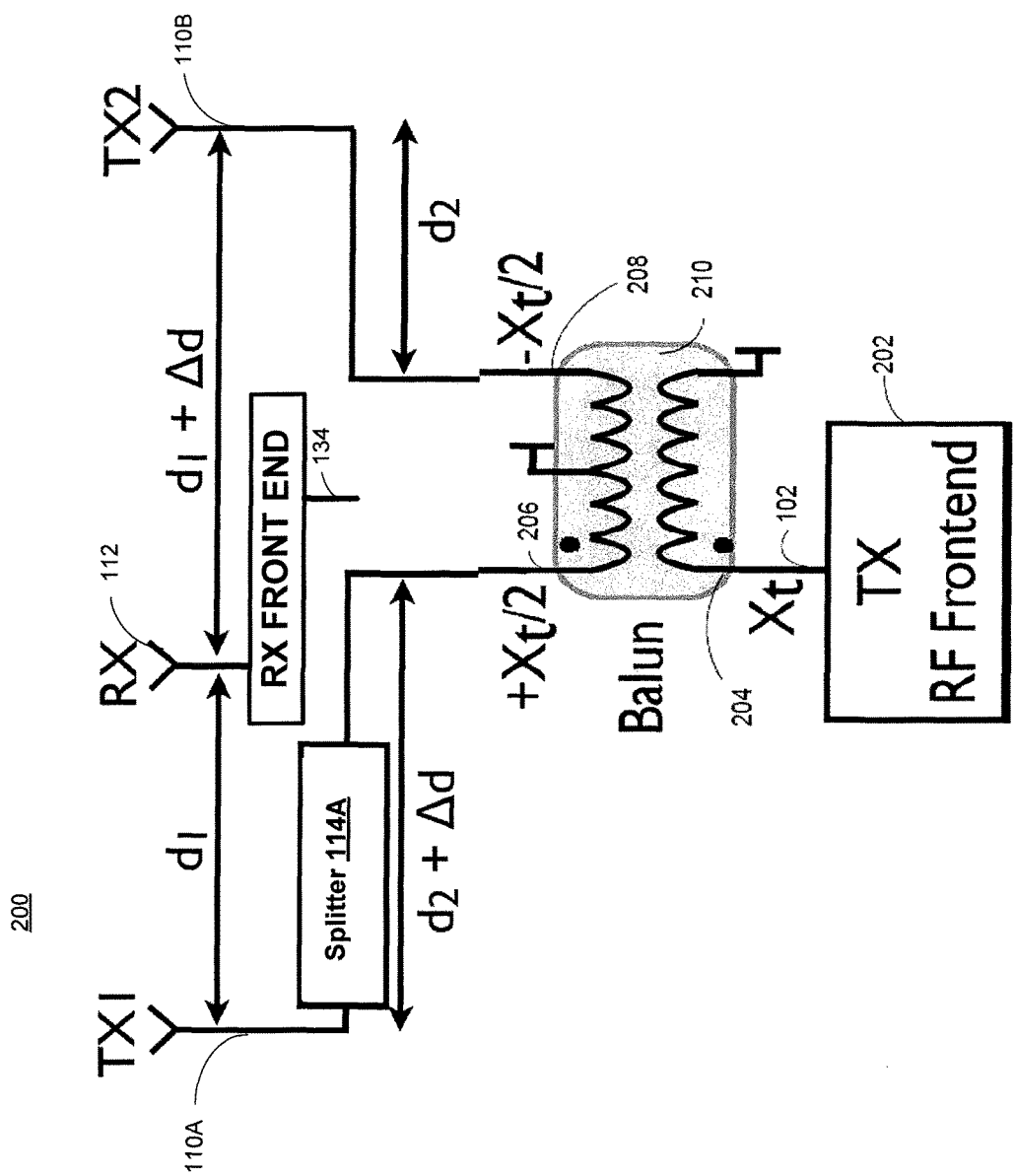
FIG. 2A depicts another example of a system configured in accordance with some exemplary embodiments described herein.

Like labels are used to refer to same or similar items in the drawings.

DETAILED DESCRIPTION

FIG. 1 depicts an example of a system 100 for full duplex wireless communications that can be adaptively tuned by adapter 195 consistent with some exemplary embodiments. Referring to FIG. 1, a signal to be transmitted ("transmit signal") 102 is provided to a splitter 114B. The splitter 114B provides a portion of signal 102 to a transmitter 110B, where the signal 102 is transmitted. The splitter 114B also provides another portion of signal 102 to splitter 114A. Splitter 114A divides signal 102 to provide a portion to transmitter 110A and another portion to an analog RF-based canceller 120. The transmitter 110A then proceeds to transmit its portion of signal 102.

The analog RF-based canceller 120 includes inputs 116A-B. The first input 116A represents a sample of signal 102, which was transmitted by transmitters 110A-B. The second input 116B represents a received signal 104 obtained from receiver 112. This received signal 104 may include a so-called "self-interference" signal and a signal of interest. The self-interference represents the signals transmitted at 110A-B by system 100 and subsequently received at the receiver 112 of the same device. The signal of interest may represent a signal transmitted by another device, such as another radio, cell phone, and the like. The analog RF-based canceller 120 is configured to remove some, if not all, of the unwanted "self-interference" received by receiver 112 of system 100. This reduction and/or removal of the self-interference may, in some implementations, enable system 100 to operate effectively in full duplex. In short, the system 100 is able to operate in full duplex by transmitting at 110A-B while simultaneously receiving at receiver 112 by at least using the analog RF-based canceller 120 to reduce the self-interference caused by the transmitters 110A-B.

System 100 further includes an adapter 195 for adaptively tuning the reduction of the self-interference. In some exemplary embodiments, adapter 195 reduces the self-interference in the radio frequency (RF) domain and, in particular, the analog RF domain before the analog-to-digital converter 125. Furthermore, the adapter 195 may be tuned based on a parameter, such as a received signal strength indicator (RSSI) measured at the output 116C of the analog RF-based canceller 120. For example, the adapter 195 may adjust at least one of the phase and the amplitude of a cancellation signal of the analog RF-based canceller 120, and the adjustment may be based on the measured RSSI using an optimization technique, such as for example gradient descent.

Moreover, the adapter 195 may adaptively tune the digital canceller 130 to reduce the self-interference. The adapter 195 is further described below.

In some exemplary embodiments, the antennas for transmitter 110A-B and receivers 112 are positioned in order to reduce some of the unwanted self-interference received by system 100. Specifically, the placement of the antennas for transmitter 110A-B and receiver 112 may use the constructive and destructive interference patterns over free space to reduce some of the unwanted self-interference. The use of constructive and destructive interference patterns to reduce and/or remove self-interference may be referred to herein as antenna cancellation.

In some exemplary embodiments, the distance between the receive antenna 112 and the two transmit antennas 110A-B may differ by odd multiples of half the wavelength of the center frequency of transmission. For example, if the central wavelength of transmission is represented by wavelength λ, and the distance of the receive antenna is distance d from one transmission antenna, then the other transmission antenna is placed at a second distance d+λ/2 away from the reception antenna. This placement causes the self-interference signal from the antennas of transmitters 110A-B to add destructively at the antenna of receiver 112, causing attenuation of the self-interference signal received at receiver 112.

FIG. 2A (which is further described below) depicts an example implementation of the antennas of the transmitters 110A-B and receivers 112. In some implementations, the splitter 114A may attenuate the signal before transmission at 110A, so that the power measured at receiver 102 of the signal transmitted by transmitter 110A is about matched to the power of the signal transmitted at transmitter 110B. This matching may, in some implementations, achieve enhanced reduction of the self-interference at receiver 112.

Although the placement of the antennas may provide further reductions of the self-interference caused by transmitters 110A-B, antenna placement may not be sufficient. Moreover, in some implementations, the placement of the antennas as described with respect to FIGS. 1 and 2A may not be possible, or implemented. As such, the analog RF-based canceller 120 may be used, alone or in combination with antenna placement/cancellation, to reduce some, if not substantially all, of the self-interference from transmitters 110A-B.

Referring again to FIG. 1, the analog RF-based canceller 120 may be configured to cancel some, if not substantially all, of the self-interference caused by the transmissions of transmitters 110A-B which are subsequently received at receiver 112. In some exemplary embodiments, the analog RF-based canceller 120 is implemented to offset the two input signals 116A-B to cancel some of the self-interference caused by transmitters 110A-B. For example, the analog RF-based canceller 120 may include a noise cancellation circuit, such as an Intersil QHx220 and the like, to offset the cancellation signal provided as an input at 116A. When this offset signal is processed (e.g., combined, etc.) with the received signal from input 116B and receiver 112, the analog RF-based canceller 120 may reduce some of the unwanted self-interference contained in the received signal from receiver 112. Moreover, the adapter 195 may, in some exemplary embodiments, adaptively tune the offset cancellation signal, as noted above, to maximally cancel the unwanted self interference contained in the received signal from input 116B. For example, the adapter 195 may adjust at least one of the offset (or phase) and the amplitude of the cancellation signal of the analog RF-based canceller 120, and this adjustment may be based on the measured RSSI at 116C using for example gradient descent to find optimum values of offset/amplitude for the cancellation signal.

The signal output 116C of the analog RF-based canceller 120 may be provided to an analog-to-digital converter 125, which provides a digital output to a digital canceller 130. The digital canceller 130 may receive digital baseband data from analog-to-digital converter 125 and receive digital transmit samples 132. The transmit samples 132 may correspond to buffered/stored digital samples of what was carried by transmit signal 102. Next, the digital canceller 130 processes the received digital data using digital noise cancellation techniques to remove from the received digital baseband data any unwanted self-interference. Digital noise cancellation (which is used in headphones to remove ambient noise in audio) may also be used to remove noise from a digital signal. Next, digital canceller 130 outputs digital data (labeled digital output samples 134B) representative of the signal of interest contained in the received signal 104 obtained at receiver 112. Moreover, the adapter 195 may, in some exemplary embodiments, adaptively tune the digital canceller 130 as further described below. The digital output samples 134B may be further processed by, for example, decoding, and the like.

In some exemplary embodiments, the system 100 may include one or more of antenna placement/cancellation, analog RF-based cancellation, and/or digital noise cancellation to reduce, if not substantially eliminate, unwanted self-interference caused by full duplex transmit and receive at transmitters 110A-B and receiver 112.

The transmitters 110A-B may each be implemented as any type of radio frequency (RF) transmitter configured to transmit a signal, such as transmit signal 102. The transmitters 110A-B may further include one or more components, such as a filter, an amplifier, an antenna port, an antenna, and the like. The receiver 112 may be implemented as any type of RF receiver and may further include one or more components, such as a filter, an amplifier, an antenna port, an antenna, and the like.

The transmit signal 102 and the receive signal 104 may be implemented as any type of signal. However, in some implementations, the transmitted signal 102 may be configured as an RF signal in accordance with a standard, such as for example wideband code division multiple access (W-CDMA), Long Term Evolution-Advanced, Wi-Fi, and the like.

The analog RF-based canceller 120 may be configured to reduce, if not substantially remove, the self-interference caused by full duplex transmit and receive at transmitters 110A-B and receiver 112. In some implementations, the analog RF-based canceller 120 performs the cancellation in the analog, radio frequency domain to enable reduction/removal of self-interference in a higher dynamic range environment, when compared to digital, baseband cancellation. For example, digital noise cancellation operates in the digital domain but operates with a dynamic range limited by the number of bits capable of being processed. The digital noise cancellation provided by digital canceller 130 may not have sufficient dynamic range to remove large amounts of self-interference, and such a dynamic range limitation is not present in the analog RF-based canceller 120. As such, the analog RF-based canceller 120 may have a wider dynamic range and thus be capable of removing a larger amount of self-interference from the received signal, when compared to digital canceller 130. Moreover, the analog RF-based canceller 120 may perform the cancellation in the analog RF domain to enable reduction/removal over a wider bandwidth, when compared to solely using antenna cancellation.

In some exemplary embodiments, the system 100 may include the analog RF-based cancellation, alone or in combination with one or more of antenna placement/cancellation and/or digital noise cancellation.

The analog-to-digital converter 125 may be implemented as any type of analog-to-digital converter capable of processing the analog RF output 116C provided by analog RF-based canceller 120. The digital canceller 130 may be implemented as a digital noise canceller, such as for example a finite impulse-response (FIR) filter that models the self-interference channel from the transmitter to the receiver followed by a subtraction logic that subtracts the output digital samples from the FIR filter from the received samples 134A.

In some exemplary embodiments, the analog RF-based canceller 120 is configured to reduce and/or remove the self-interference based on a signal inversion rather than an offset. For example, a negative version of the transmit signal may be generated and used as a reference signal. The reference signal is then combined with the received signal to reduce and/or remove the self-interference caused by the full duplex transmit and receive at transmitters 110A-B and receiver 112. The analog RF-based canceller 120 may generate a negative version of the signal to cancel the self-interference signal irrespective of the bandwidth or the frequency. In some exemplary embodiments, the analog RF-based canceller 120 may include passive transformer circuits to generate the signal inversion. An example of passive transformer circuits are balanced-to-unbalanced converters, which are also referred to as Baluns and/or signal inverters. In some exemplary embodiments, the adapter 195 may, as noted above, adaptively tune at least one of the attenuation and phase of the inverted signal so that it matches the self-interference signal received via receiver 112.

Referring again to FIG. 2A, it depicts an example system 200 including an analog RF-based canceller based on signal inversion. The description of FIG. 2A also refers to FIG. 1. The system 200 includes a transmitter RF front end 202 that provides the transmit signal 102 to signal inverter 210. The signal inverter 210 receives at 204 the transmit signal 102 and then generates outputs 206 and 208. The output 206 is a positive version of the transmit signal 102, although at reduced power, and the output 208 is a negative, reduced power version of the transmit signal 102. The signal inverter output 206 is coupled to splitter 114A (which may further include attenuation) and transmitter 110A, and the signal inverter output 208 is coupled to transmitter 110B. At receiver 112, the transmissions from 110A and 110B are inverted such that the transmitted signals 110A-B cancel each other at receiver 112, reducing, if not substantially removing the self-interference.

Figure 2B:
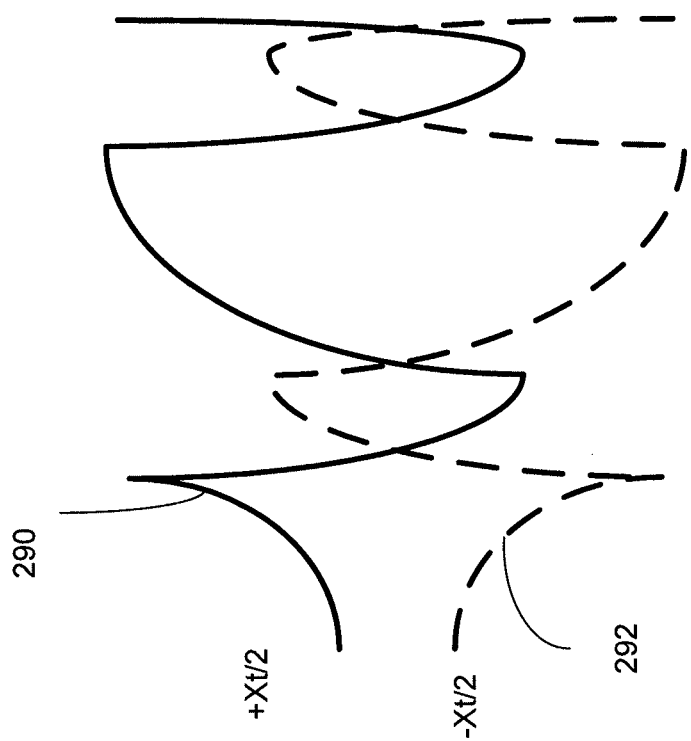
FIG. 2B depicts example plots of inverted signals.

To illustrate signal inversion, FIG. 2B depicts an example of a first signal 290 (solid line) generated by signal inverter 210, and then output via 206, splitter 114A, and transmitter 110A. FIG. 2B also depicts an example of an inverted signal 292 (dashed line) generated by signal inverter 210, and then output via 208 and transmitter 110B. At receiver 112, the signals 290 and 292 transmitted by 110A-B cancel each other, thus reducing, if not substantially removing, the self-interference at receiver 112.

Figure 3A:
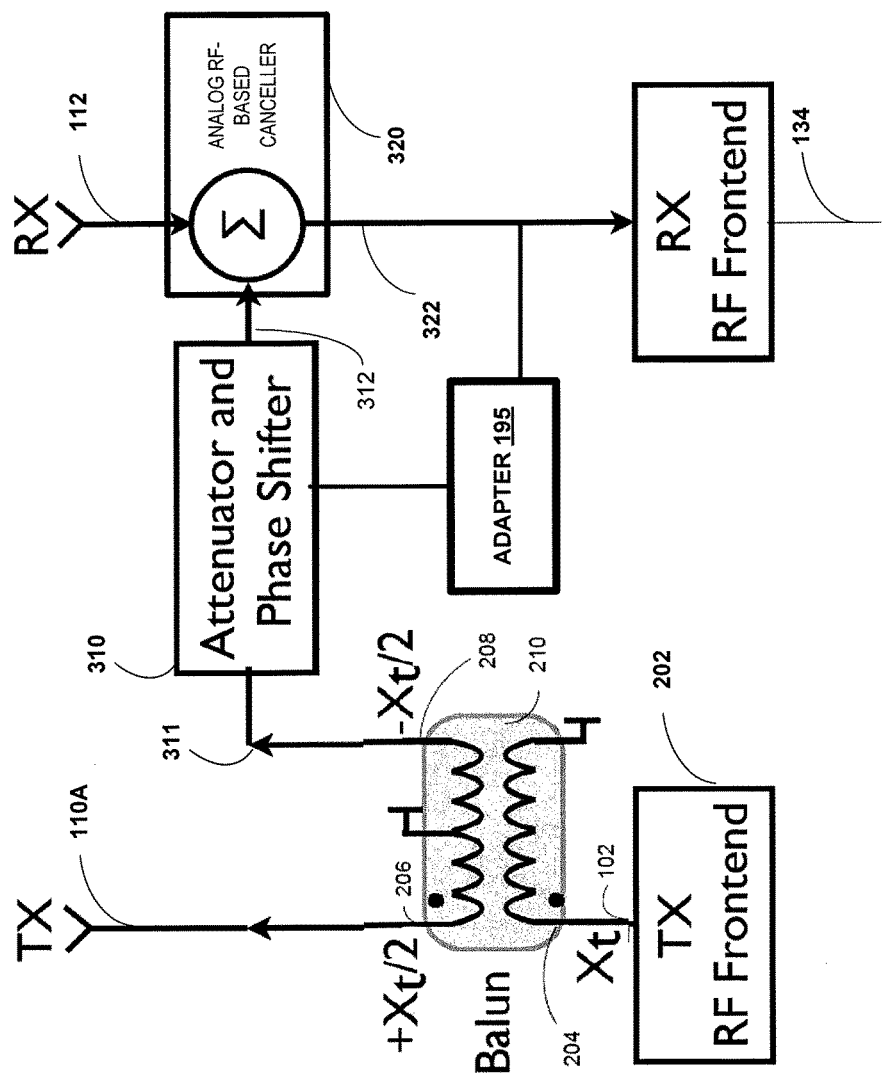
FIG. 3A depicts another example of a system configured in accordance with some exemplary embodiments described herein.

FIG. 3A depicts another system 300. System 300 is similar to system 200 but includes an attenuator and phase shifter 310. System 300 further includes a hard wire cancellation path (e.g., via 208 to 312), rather than an over the air cancellation path. Referring to FIG. 3A, the transmitter RF front end 202 provides the transmitted signal 102 to signal inverter 210, where outputs 206 and 208 are generated as described above with respect to FIG. 2A. The signal inverter output 206 is coupled to transmitter 110A, and the signal inverter output 208 generates an inverted, negative signal, which is coupled to the attenuator and phase shifter 310 and is adaptively tuned by adapter 195.

Figure 3B:
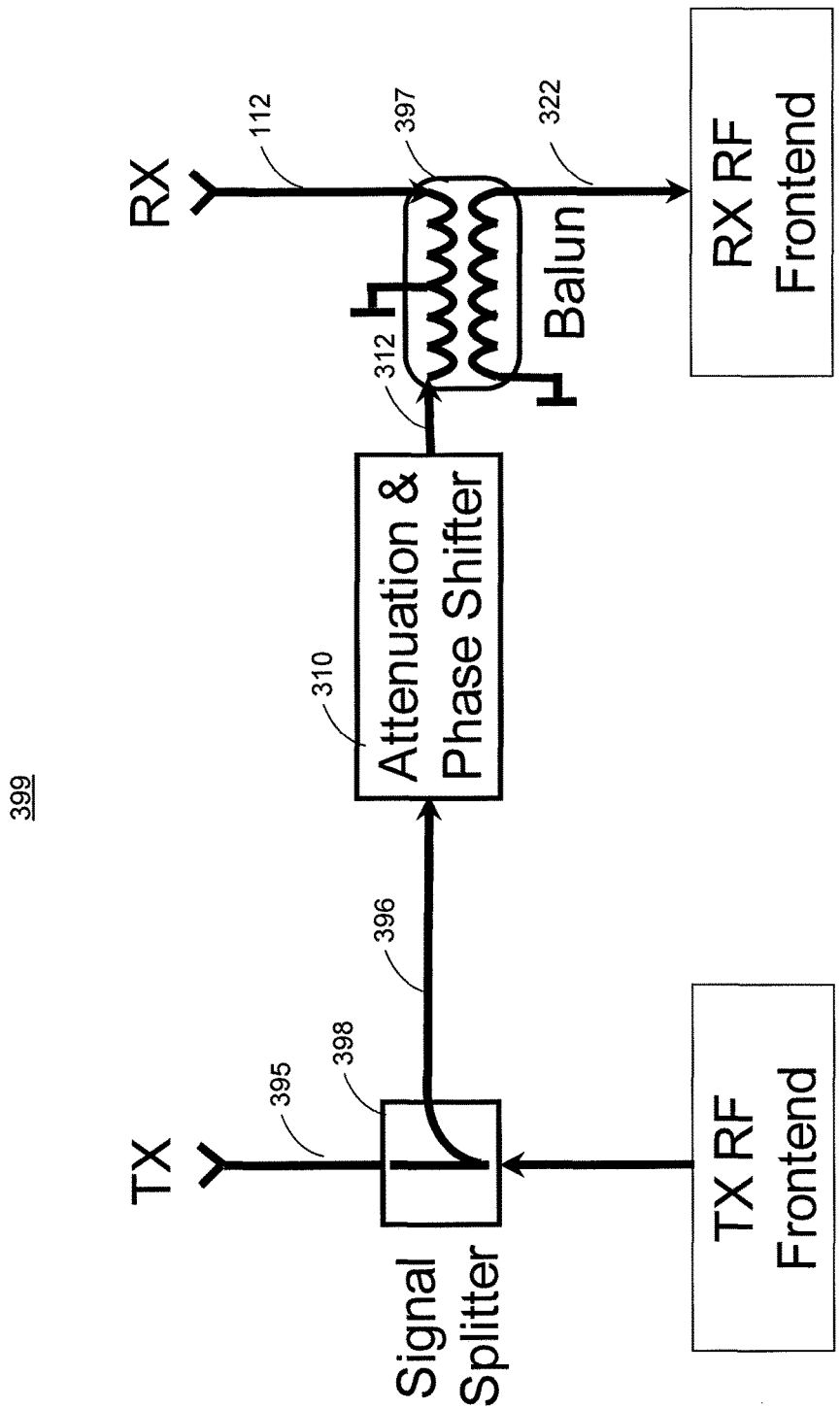
FIG. 3B depicts another example of a system configured in accordance with some exemplary embodiments described herein.

FIG. 3B depicts an example of a system 399 for full duplex wireless communications. System 399 is similar to system 300 but uses balun 397 as an analog subtraction circuit to subtract the cancellation signal 312 from the self-interference signal received over the air via receiver 112. In this example, a signal splitter 398 is used at the transmit side to generate the transmit signal 395 and cancellation signal 396 having the same, or similar, polarity instead of the inverted polarity of the system 300.

The attenuator and phase shifter 310 may include a variable RF delay line (or a phase shifter) and a variable RF attenuator. The attenuator and phase shifter 310 is adjusted by adapter 195 to generate a cancellation signal over the wire path (e.g., path 208 to 312) that substantially matches the self-interference signal received over the air (e.g., from 110A to receiver 112). To match signals 312 and 112, the attenuator and phase shifter 310 may be tuned by adapter 195. When the cancellation signal 312 from the wire path is combined at 320 with the self-interference signal received at 112 from the air path, the output 322 of the analog RF-based signal canceller 320 may reduce, if not substantially eliminate, the self-interference signal, providing thus an output 322 with reduced/eliminated unwanted self-interference caused by single channel full duplex operation of system 300.

In some exemplary embodiments, adapter 195 may adaptively tune the attenuator and phase shifter 310. For example, the adapter 195 may adjust at least one of the delay (e.g., offset, phase, and the like) and the attenuation provided by the attenuator and phase shifter 310 to adjust the inverse signal generated by signal inverter 210. This adjusted inverse signal represents a cancellation signal which when combined with the received signal obtained at receiver 112 reduces, if not eliminates, the self-interference included in the received signal.

Referring again to FIG. 1, the adapter 195 may also adjust the digital canceller 130. When this is the case, the adapter 195 forms an estimate of the wireless channel ("the channel estimate") from the transmit side to the receive side of a full-duplex system 100 in terms of digital samples, after analog RF cancellation is implemented. The digital transmit samples 132 are transformed using this channel estimate (which may be determined by a FIR filter) to determine an estimate of the self-interference in the received digital samples. This estimate of the self-interference is subtracted from the received digital samples 134A at the digital canceller 130 to generate digital output samples 134B, which has a substantial reduction, if not elimination, of the self-interference in the digital domain.

Referring to FIG. 3A, the adapter 195 may adjust the phase and amplitude of the inverted signal provided by signal inverter 210 to enhance the reduction, or elimination, of self-interference in the analog domain. Because the wireless channel may change over time, the adapter 195 may adaptively tune at least one of the phase and the amplitude by tuning the attenuator and phase shifter 310, so that the output 312 of the attenuator and phase shifter 310 matches the self-interference represented by the transmit signal received via receiver 112. The following describes an example of an exemplary process for adaptively tuning at least one of the phase and the amplitude in response to changes in the radio channel.

In some exemplary embodiments, the adapter 195 may estimate the attenuation and/or the delay of the self-interference signal received at 112. This self-interference signal represents the transmit signal transmitted by transmitter 110A as well as the effects of the radio channel. The adapter 195 may then match the self-interference signal received at 112 with inverse signal generated by signal inverter 210, wherein the phase and/or attenuation of the inverse signal is adaptively adjusted to take into account an estimate of the radio channel.

For example, the adapter 195 may adjust the attenuation and/or delay at attenuator and phase shifter 310 such that a parameter (e.g., the residual energy after signal inversion cancellation at 322) is substantially minimized. This may be represented in mathematical form as follows. Given a variable attenuation g, a variable delay factor τ, a signal s(t) representing the received signal at the input 311 of the tunable attenuator and phase shifter 310, a delay over the air (e.g., the wireless radio channel) $\tau_a$, an attenuation over the wireless radio channel of attenuation $g_a$, and the energy, E, of the residual signal at 322 after signal inversion cancellation may be represented by the following equation:

$$E = \int_{T_o} (g_a s(t-\tau_a) - g s(t-\tau))^2 dt$$

wherein $T_o$ is the baseband symbol duration. The adapter 195 may adjust the variable attenuation and/or delay at attenuator and phase shifter 310 so that energy of the residual signal is substantially reduced (e.g., about a minima).

In some exemplary embodiments, an optimization technique, such as a gradient descent algorithm, may be used to converge to an optimal setting of delay and/or attenuation at attenuator and phase shifter 310, although other numerical techniques may be used to determine at least one of the attenuation and the delay at attenuator and phase shifter 310.

The adapter 195 may use linear vector modulation, such as for example the linear vector modulation implemented in the Intersil QHx220 noise cancellation chip, to approximate the delay and attenuation circuit for modifying the amplitude and delay of the cancellation signal. Linear vector modulation uses an in-phase (0 degree delay) and a quadrature version (90 degree delay) of an input signal. The two versions are independently scaled with different attenuation and then combined to approximate any phase shift and scaling of the input signal as the output signal.

Figure 4:
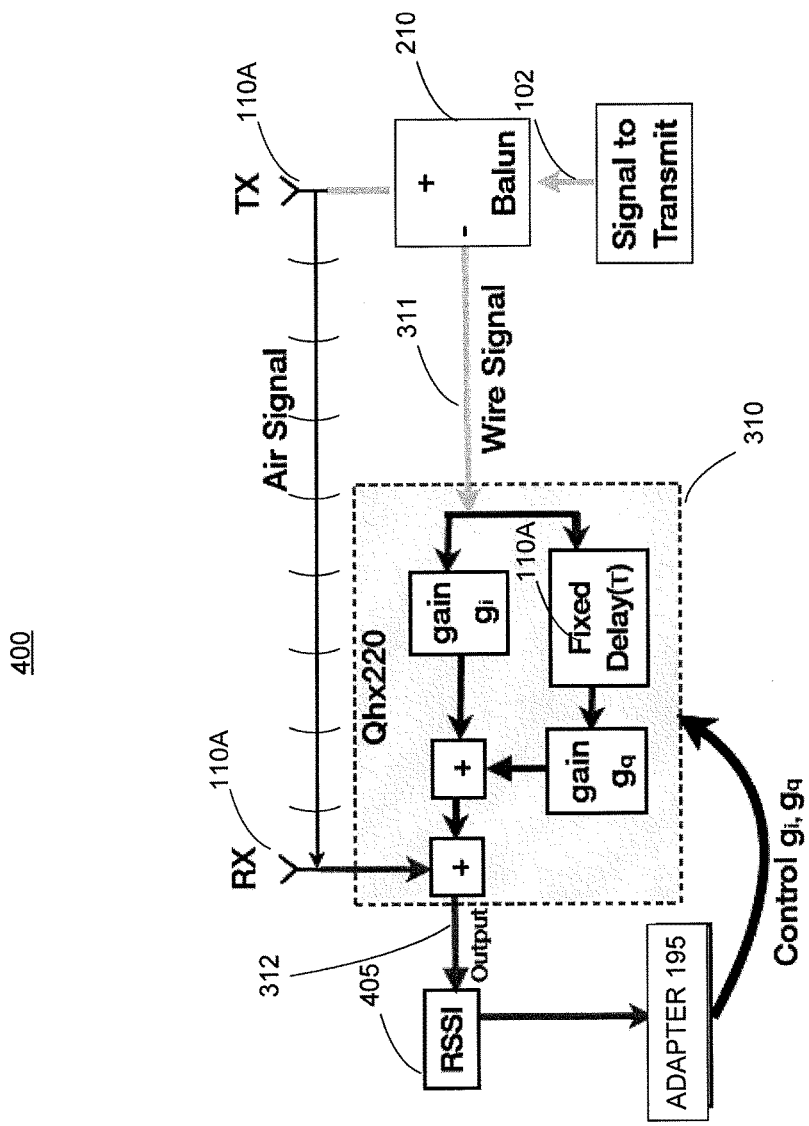
FIG. 4 depicts another example of a system configured in accordance with some exemplary embodiments described herein.

FIG. 4 depicts an example of self-interference cancellation based on adaptively tuning with linear vector modulation used as an approximation for implementing delay and/or attenuation at attenuator and phase shifter 310. Although FIG. 4 depicts using the QHx220 for linear vector modulation, other mechanisms may be used as well. The received signal strength indicator (RSSI) values represent the energy remaining after cancellation (e.g., at 322 at FIGS. 3A-B or 116C at FIG. 1). The processes described herein may adapt the attenuation parameters of QHx220 (attenuation parameters $g_i$ and $g_q$) to minimize the RSSI energy values remaining after cancellation (e.g., at 322 at FIGS. 3A-B or 116C at FIG. 1). The RSSI value may provide an indication of the residual signal energy after analog RF-based canceller 322 (e.g., using signal inversion cancellation) has subtracted the self-interference from the received signal.

In the example implementation of FIG. 4, the QHx220 chip does not actually provide a variable delay but instead the QHx220 takes the input signal and separates it into an in-phase and quadrature component. The quadrature component has a fixed delay with respect to the in-phase component. The QHx220 emulates a variable delay by controlling the attenuation of the in-phase and quadrature signals ($g_i$ and $g_q$), adding them to create the output. In the example of FIG. 4, the optimization goal of the adapter 195 auto-tuning algorithm is to find the attenuation factors on both lines such that the energy of the residual signal 312 after combining, for example, the QHx220 output and the input from the receive antenna 110A is minimized. The adapter 195 may use these and other optimization techniques, such as a gradient descent algorithm and the like, for tuning the two attenuation factors in QHx220, $g_i$ and $g_q$ to find the optimal cancellation point.

In some exemplary embodiments, the optimization technique used by the adapter 195 is configured as a gradient descent algorithm, although other techniques may be used as well. The gradient descent algorithm works in incremental steps, and at each step, the gradient descent algorithm computes a slope of the residual RSSI curve by changing $g_i$ and $g_q$ by a step size, such as a fixed step size. If the next/new residual RSSI is lower than the previous residual RSSI, then the gradient descent algorithm moves to other settings for the attenuation factors $g_i$ and $g_q$, and repeats this process. If at any point, the gradient descent algorithm finds that the residual RSSI increases, the gradient descent algorithm determines it is close to an optimal point. At this stage, the gradient descent algorithm reverses direction and reduces the step size to attempt to converge to the optimal point of $g_i$ and $g_q$ values that substantially minimize RSSI 405. The gradient descent algorithm may also check for false positives caused by for example to noisy minimas.

The same gradient algorithm described above can be used to adaptively tune the variable delay and attenuator in the attenuator and phase shifters of FIGS. 3A-B. In these example cases, the variable delay τ and variable attenuation g are changed across different iterations of the algorithm and the residual RSSI measurement is used to tune delay τ and variable attenuation g to obtain an optimal cancellation point.

In some exemplary embodiments, the use of an adapter 195 configured to operate with a gradient descent technique configured to adaptively tune, based on RSSI measurements, the attenuation and/or delay of the inverse signal generated by the balun circuitry 210 may enhance cancellation of the self-interference, when compared to not using adapter 195. Because the adapter 195 tunes based on the measured RSSI 405, the adapter 195 does not need to decode the signal to implement tuning in order to cancel the self-interference signal.

Referring again to FIG. 1, although the adapter 195 may be used to adapt the attenuation and delay in order to cancel the self-interference using analog RF-based cancellation, the adapter 195 may also be used to adapt the digital canceller 130 (which is after analog RF-based cancellation 120 and after analog-to-digital conversion 125) in the digital domain. Indeed, analog RF-based cancellation 120 may cancel some, if not all of, the self-interference, but may only handle the dominant self-interference component between the receive and transmit antennas. However, system 100 may still include some self-interference from multipath components, which, although much weaker than a dominant mode, are still strong enough to interfere with reception. Furthermore, when a signal inverter (e.g., balun circuit at FIGS. 3A, 3B, and 4) is used to provide analog RF-based cancellation, the signal inverter may introduce some signal distortions, which can be subsequently cancelled by the digital canceller 130. In some implementations, the full duplex radio depicted at FIG. 1 may further include digital canceller 130 to cancel some of the so-called residual interference that persists after analog RF-based cancellation. To that end, the digital canceller 130 may be adaptively tuned by adapter 195, as described further below. Moreover, in some exemplary embodiments, the digital canceller 130 may use frequency domain based channel estimation to configure time domain interference cancellation in the digital canceller 130, as described further below.

In some implementations, digital canceller 130 may estimate the wireless radio channel carrying the residual self-interference after analog RF-based cancellation and then use this channel estimate of the known transmit signal to generate digital samples to subtract from the received signal. To determine a wireless channel estimate, the system 100 may use known training symbols at the start of a transmitted packet. Next, the system 100 may estimate a model of the combination of the wireless channel estimate and any effects caused by the cancellation circuitry of system 100. This estimation may use the least square algorithm due to its low complexity, although other estimation techniques may be used as well.

For example, the training symbols (which may be presented as transmit samples 132) carried by the transmit signals 102 may be defined in the frequency domain using orthogonal frequency division multiplexing signaling (OFDM), in which each OFDM sub-band is narrow enough to have a substantially flat frequency response. Thus, the system 100 may be able to estimate the frequency response of the channel carrying the self-interference (e.g., the above-noted combined estimate) as a complex scalar value at each subcarrier. For example, given an $X=(X[0], \ldots, X[N-1])$ representing the vector of the training symbols (which may be presented as transmit samples 132) carried by transmit signal 102 used across the N subcarriers for a single OFDM symbol, M representing the number of such OFDM training symbols, and Y represent the values of the receive samples 134A after going through the self-interference channel, the least squares estimation may determine the channel frequency response of each subcarrier k, $\hat{H}_s[k]$ according to the following equation:

$$\hat{H}_s[k] = \frac{1}{M} \left| \frac{1}{X[k]} \left( \sum_{m=1}^{M} Y^{(m)}[k] \right) \right|.$$

The channel frequency response, $\hat{H}_s[k]$, thus represents the channel estimate of the radio channel which carried the training symbols carried by the transmit signal 102.

After getting the channel estimate in the frequency domain, the system 100 may then apply the inverse fast Fourier transform (IFFT) to the frequency response to obtain the time domain response of the channel. Upon transmission, the system 100 generates digital samples from the time domain response and subtracts them from the observed signal. The time domain response of the self-interference channel can be emulated using a standard finite impulse response (FIR) filter in the digital domain.

By estimating the frequency response in this way, a least squares estimation may be used to determine a best fit that minimizes overall residual error. The least squares estimation may be more robust to noise in samples, when compared to other approaches, such as simple preamble correlation. Alternatively, more complex algorithms such as minimum mean squared error (MMSE) estimation may be used to get the channel estimate.

Next, the digital canceller 130 applies the estimated time domain channel response to the known transmitted baseband signal 132 and subtracts it from the received digital samples 134A. To generate these digital samples, the hardware processes (e.g., convolves) the known signal with the FIR filter representing the channel estimates. Given an s[n] representing the known transmitted digital sample at time n fed into the FIR filter, the output i[n] of the filter is the linear convolution of $\hat{h}_s[n]$ and s[n] may be represented by the following equation:

$$i[n] = \sum_{k=0}^{N-1} \hat{h}_s[k]s[n-k].$$

After this step, the digital canceller 230 may subtract the estimates of the transmit signal samples 132 from the received samples r[n] 134A in accordance with the following equation:

$$\hat{r}[n] = r[n] - i[n]$$
$$= \sum_{k=0}^{N-1} h_d[k]d[n-k] +$$
$$\sum_{k=0}^{N-1} (h_s[k] - \hat{h}_s[k])s[n-k] + z[n],$$

wherein d[n] and $h_d[n]$ are the transmitted signal and channel impulse response from the intended receiver, and z[n] is additive white Gaussian noise. Thus, in some exemplary embodiments, the digital canceller 130 uses frequency domain based channel estimation to configure time domain interference cancellation.

While channel estimation is described herein in the frequency domain, in practice, the actual digital cancellation mechanism may be implemented in the time domain, as well. In some exemplary embodiments, the training symbols carried by the transmit signal 102 are sent in accordance with a media access control (MAC) protocol configured to provide an interference-free period for channel estimation via carrier sense.

Figure 5:
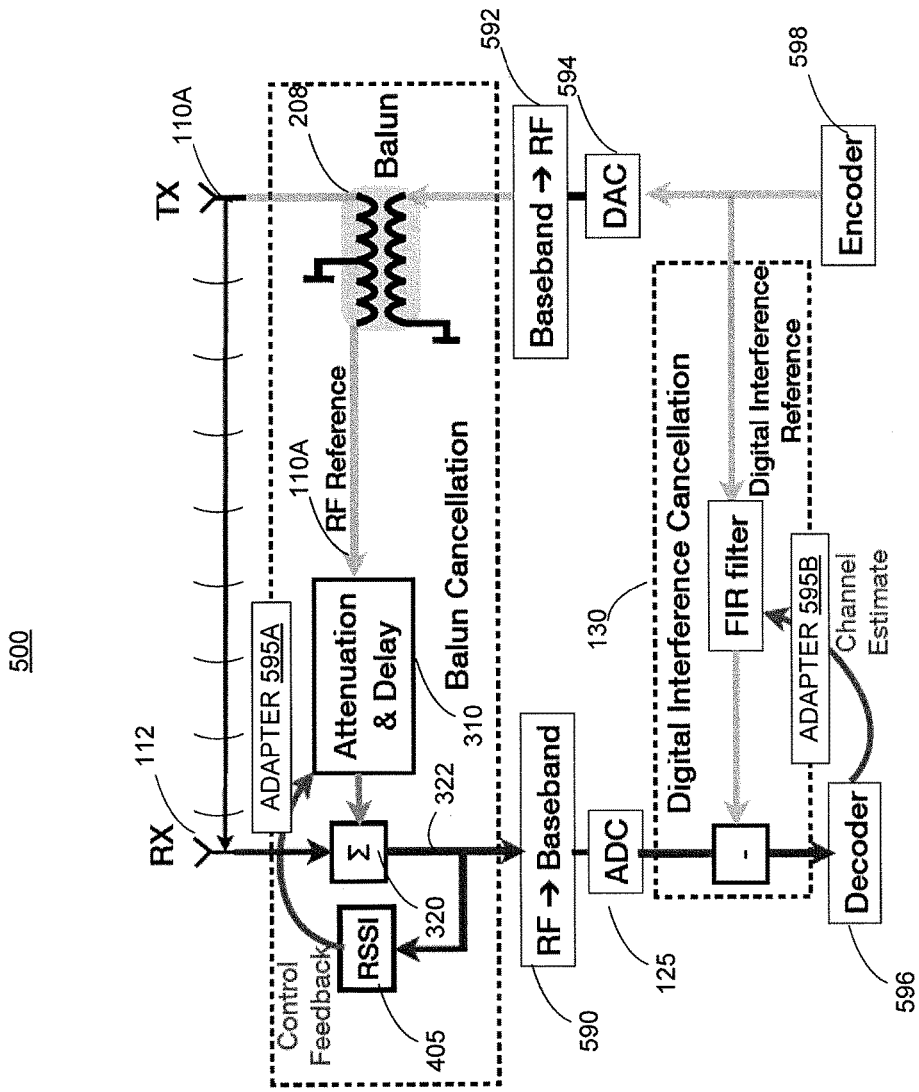
FIG. 5 depicts another example of a system configured in accordance with some exemplary embodiments described herein.

FIG. 5 depicts another example of a system 500 for full duplex wireless communications which can be adaptively tuned consistent with some exemplary embodiments. The description of FIG. 5 will also refer to FIGS. 1, 2A, 3A-B, and 4. System 500 is similar to systems 100, 200, 300, 399, and 400 in some respects but system 500 depicts an adapters 595A-B.

Adapter 595A adaptively tunes attenuation and delay 310 used to cancel the self-interference at the analog RF-based canceller 320. Specifically, at least one of the attenuation and phase of the inverted signal 311 generated by balun 208 is adjusted by adapter 595A to match the self-interference signal received via receiver 112. When these signals substantially match, the analog RF-based canceller 320 may have an output 322 that substantially reduces, if not eliminates, the self-interference.

FIG. 5 also depicts an RF to baseband converter 590, which is further coupled to analog-to-digital converter 125. The analog-to-digital converter 125 is coupled to digital canceller 130. Digital canceller 130 receives from adapter 595B an adaptive channel estimate determined in the frequency domain, as described above with respect to adapter 195. The output of the digital canceller 130 is further processed by decoder 596.

FIG. 5 also depicts encoder 598 which encodes digital data including the training symbols described above. The encoded digital data including training signals are provided as a references to the digital canceller 130 and provided to digital-to-analog converter 594, which is further coupled to baseband to RF converter 592 to enable transmission via transmitter 110A.

Although the full duplex mechanisms described herein may be used in a variety of systems, methods, and the like, in some exemplary embodiments, the full duplex mechanisms are implemented in multiple input, multiple output (MIMO) transmission systems. The following description refers to some examples of those MIMO implementations.

In MIMO systems, multiple transmit antennas may be used to transmit independent streams over the same frequency channel. These MIMO systems often characterize the radio channel to enable the transmission over the multiple antennas. Further, MIMO systems may precisely control the phase and amplitude (or power) at each antenna. In any case, the full duplex mechanisms described herein may be used in conjunction with MIMO as described below.

In for example a 2 by 2 MIMO system, the system may provide 2 independent streams each transmitted simultaneously over a separate transmitter. Likewise, a 3×3 MIMO system can have each of its 3 transmit antennas send an independent data stream to one of the three receive antennas. The MIMO system may also use multiple antennas to improve the signal-to-noise ratio (and therefore bit rate or reliability) of a single stream. Transmit antennas may use constructive interference to increase signal strength at the receiver, while a receiver can combine signals from multiple input antennas. However, to achieve these gains, MIMO systems determine an estimate of the radio channel for each of the antennas. For example, a MIMO system may determine an estimate of the radio channel at the receiver and feedback the estimate to the transmitter, where the feedback is used to determine the MIMO precoding used for each of the transmit antennas.

Figure 6:
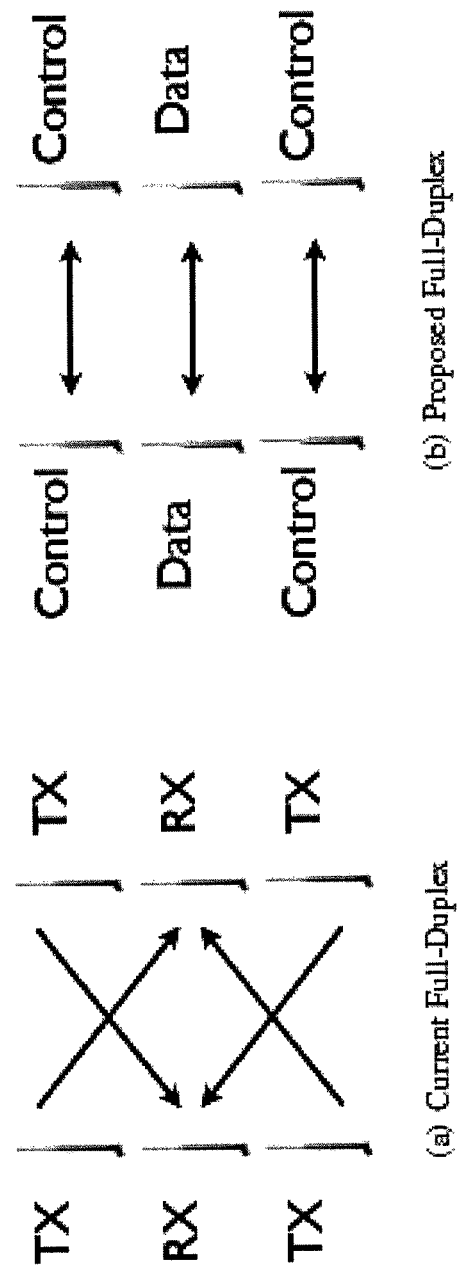
FIG. 6 depicts an example MIMO configuration using a control channel and a single data channel.

Typically, the MIMO receiver waits until after a transmission to provide the feedback. However, the full duplex mechanisms described herein may enable the receiver to promptly provide feedback to the transmitter. In some exemplary embodiments, a 3-antenna system may be configured as depicted in FIG. 6A. FIG. 6 shows two antennas for transmission and one for reception. For example, transmitters 110A-B may be implemented as the transmitters (TX) and receiver 112 may be used for reception (RX). As an example of how the structure of FIG. 6 may be used, the following example is described. A transmitter may use a data antenna to send a data stream to the data antenna of another device. At the same time, the control antennas of that receiver can send channel state information back to the control antenna of the transmitter. The transmitter then adapts its transmission rate to optimize throughput for the received feedback.

Figure 7:
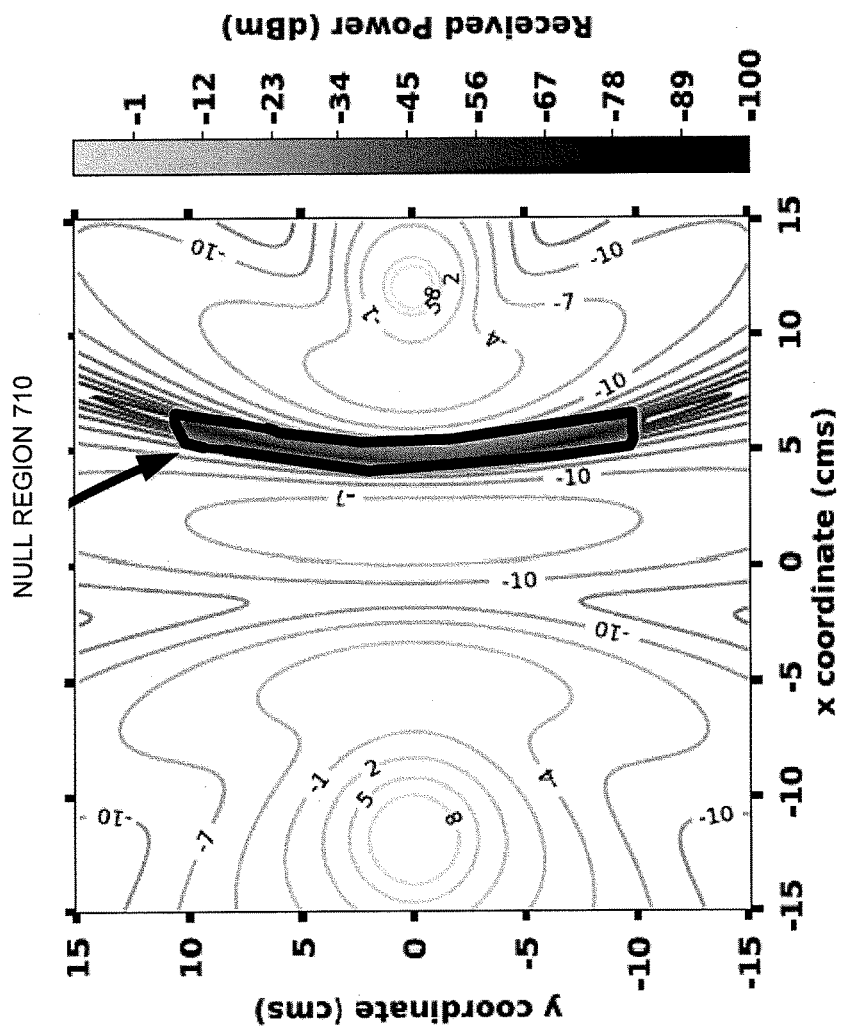
FIG. 7 depicts a null region.

FIG. 7 shows an example of a contour map 700 of received power with two transmit antennas using antenna cancellation. There is a null for the center frequency at a single point on the line between the two reverse antennas, but there is also a region 710 of very strong destructive interference spanning approximately 20 cm from this point. Antennas placed anywhere in this region 710 may observe the 30-35 dB reduction in self-interference required for full duplex operation. In some implementations, MIMO antennas may need to be spaced about a half wavelength apart for independent receptions. In exemplary implementations operating in the 2.4 GHz band, up to 4 MIMO data antennas may be placed in the 20 cm null region 710 of FIG. 7.

Figure 8A:
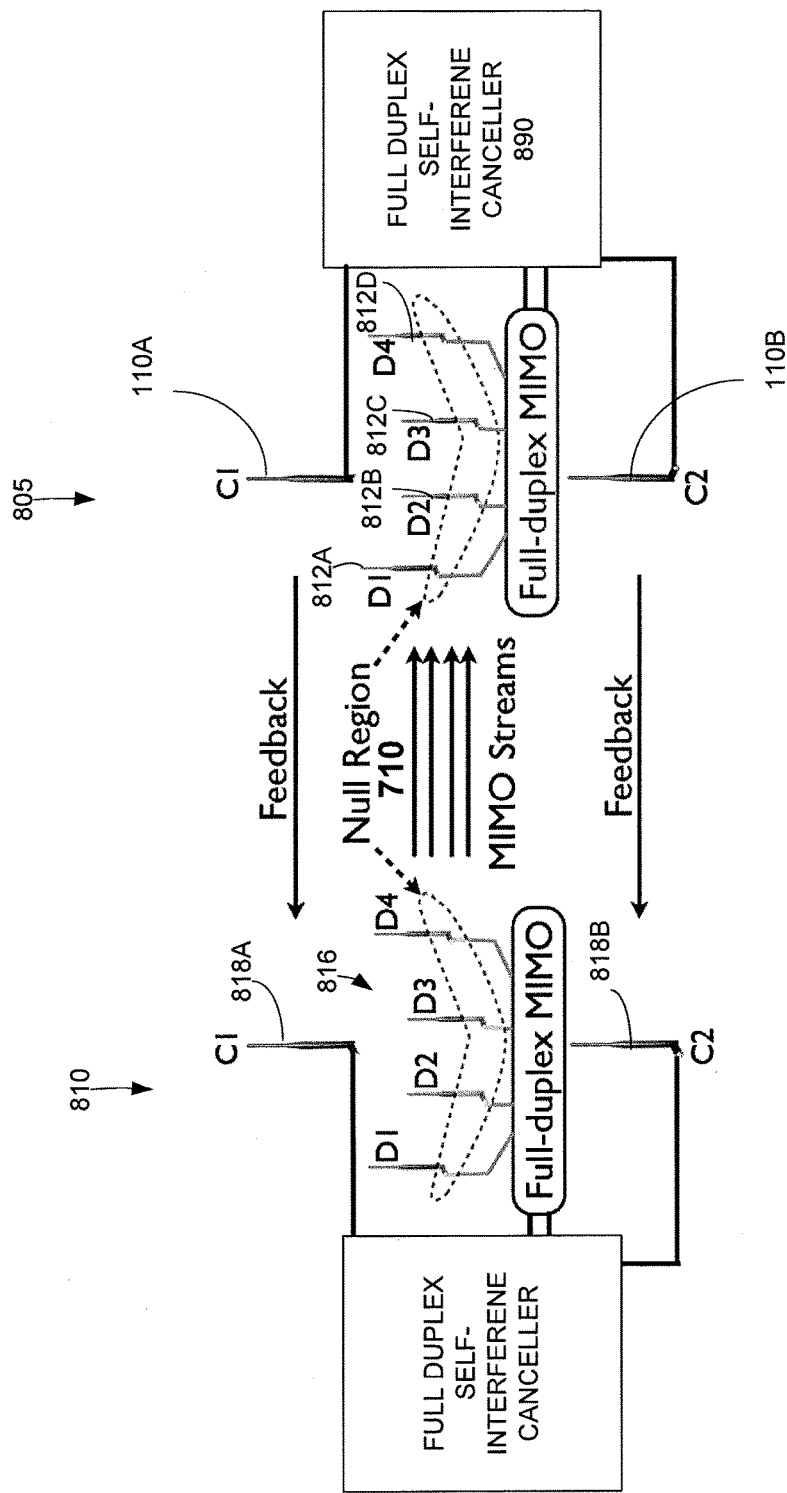
FIG. 8A depicts an example of MIMO-based system configured in accordance with some exemplary embodiments described herein.

FIG. 8A shows an example implementation of a system including a first system 805 and a second system 810, each of which is configured to operate in accordance with MIMO and the single channel full duplex mechanisms described herein which are configured to reduce, if not eliminate, self-interference. The first and second systems 805 and 810 may be implemented in a manner similar to systems 100, 200, 300, 399, but may further include additional features as described herein. The system 805 may include transmitters 110A-B including antennas configured to transmit control traffic, such as for example feedback including channel state information used in connection with MIMO system. The system 805 may include receivers 812A-D including antennas for receiving MIMO streams transmitted by system 810. The antennas associated with 812A-D may be positioned in accordance with null regions 710, enabling antenna placement-based cancellation. Furthermore, the systems 805 may include a full duplex self interference noise canceller 890 configured to include one or more of antenna cancellation, analog RF-based cancellation, and digital noise cancellation as described herein to cancel self-interference from transmission from transmitters 110A-B. System 810 may be implemented in a manner similar to system 805.

Referring again to transmitters 812A-D, the antennas are placed in the null region 710. In operation, the antennas of receiver 812A-D receive data, and the control antennas of transmitters 110A-B transmit real-time feedback. Similarly, at system 810, the data antennas 816 send data, and the control antennas 818A-B receive feedback. The symmetry of the antenna configuration of FIG. 8A means that, just as the combined transmit signal of control antennas 110A-B cancel at data antenna 812A-D, combining the receive signal of the control antennas 818A-B cancels the signals of all of the data antennas 816. Moreover, the control antennas may also be configured as part of the MIMO array. In that case, the data antennas and the control antennas are all in transmit or receive mode at the same time, and MIMO processing may use the control antennas as additional MIMO channels.

Although FIG. 8A depicts an example configuration, the configuration may be extended, in some implementations, to include additional duplex channels. In some implementations, a three-dimensional arrangement of antennas may be configured to allow a MIMO system having multiple streams in both directions. For example, a set of data antennas may be placed on a circle in a plane, and another set of antennas may be placed on a line perpendicular to that plane and passing through the center of the circle. The full duplex mechanisms described herein configured in accordance with MIMO may thus enable real-time, in-band feedback (or a control channel) in the reverse direction and a high-speed forward direction data channel.

Figure 8B:
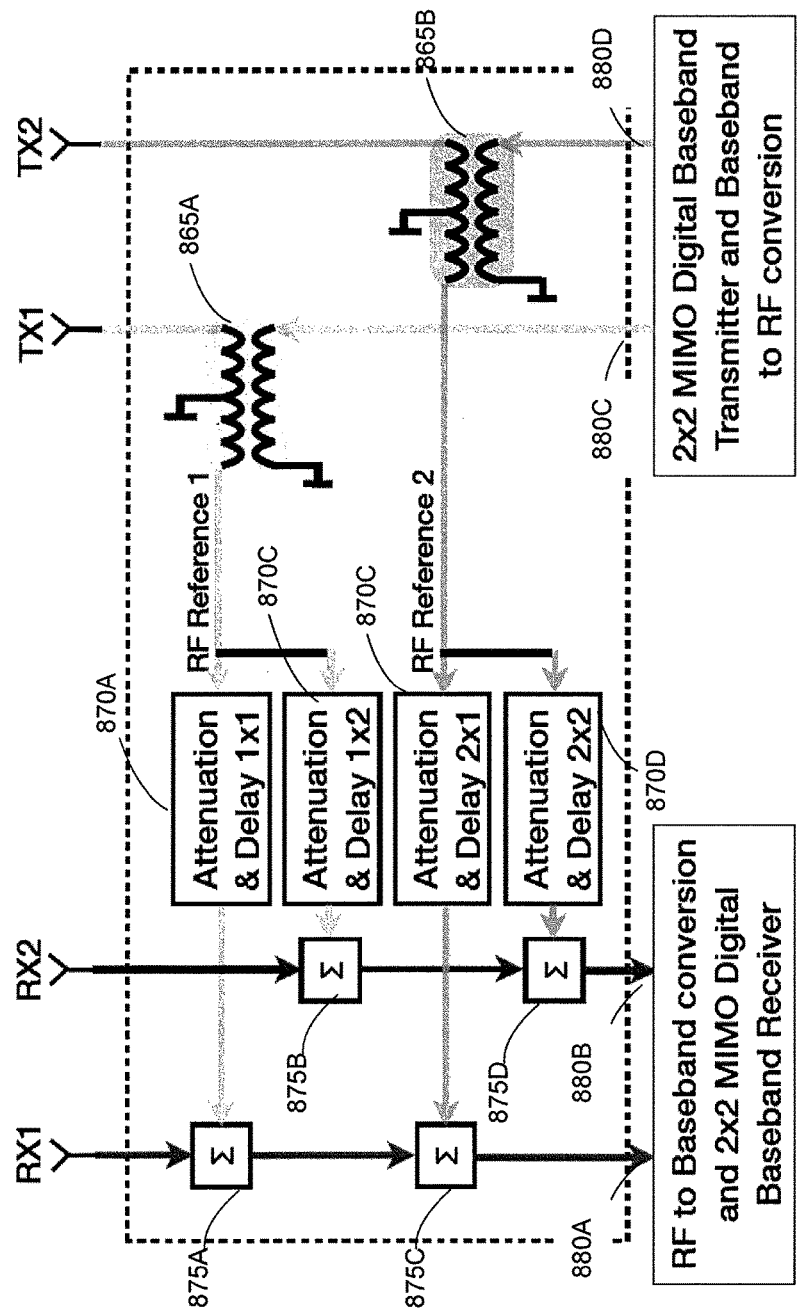
FIG. 8B depicts another example of MIMO-based system configured in accordance with some exemplary embodiments described herein.

FIG. 8B depicts an example implementation of a 2 by 2 MIMO system implemented using signal inverters (labeled baluns) 865A-B, attenuation and delay circuitry 870A-D, and analog RF-based cancellers 875A-D. The signals at 880A-B may be provided to RF to baseband converters and analog-to-digital converters before being processed by digital cancellers, and signals 880C-D represent digitized baseband signals that have been converted to RF (see, e.g., 592, 594, and 598).

In the configuration depicted at FIG. 8B, one balun is used per transmit antenna to get an inverted version of each transmit signal. Further, for any n×n MIMO system, there are $n^2$ self-interference channels, one for each transmit receive antenna pair, so the configuration of FIG. 8B uses $n^2$ (which is 4 for the 2×2 MIMO case) delay and attenuation circuits to cancel self-interference from each transmitter to each receiver. Extending the digital cancellation scheme for MIMO is relatively straightforward given the teachings herein and follows the same logic as the extension for the radio frequency cancellation scheme. The channel estimation component estimates the self-interference channel for each transmit receive antenna pair, and uses as $n^2$ FIR filters, one per transmit receive antenna pair, to get the digital cancellation signal for each pair.

Figure 9:
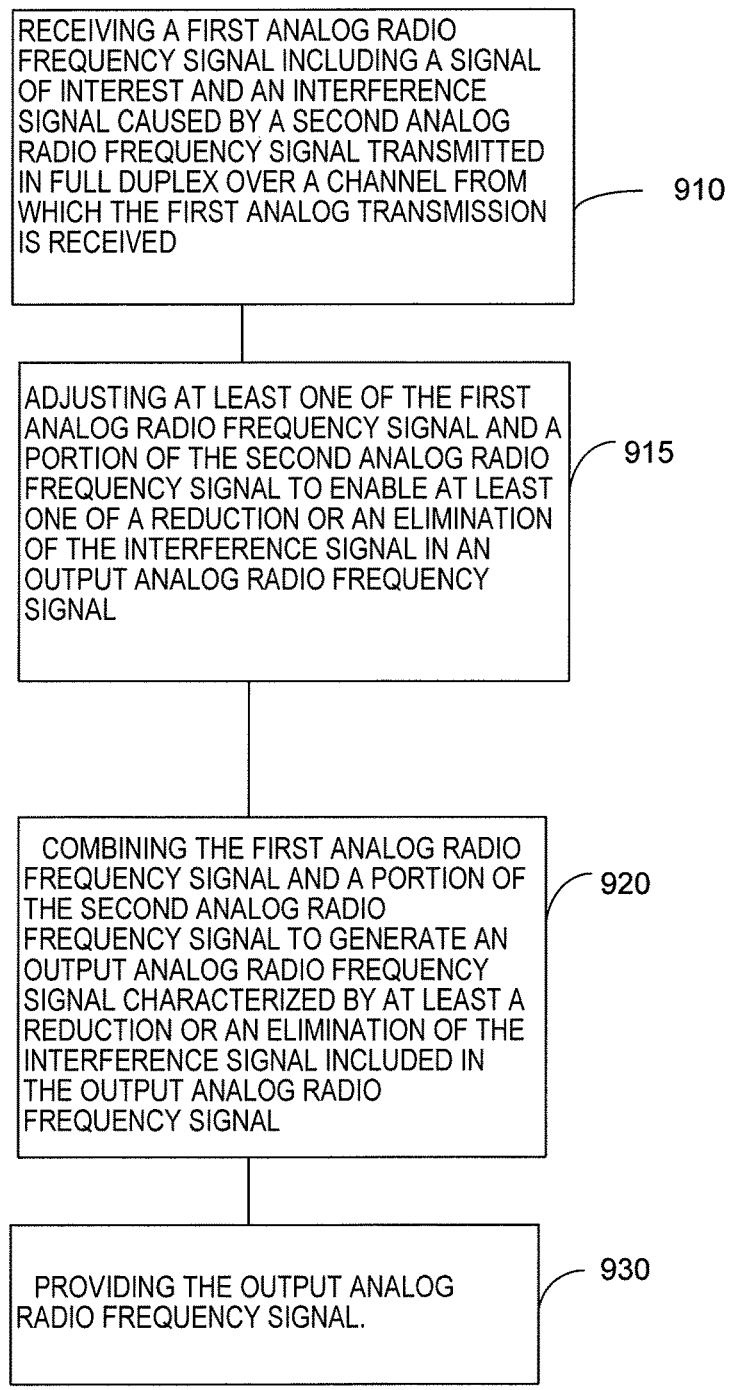
FIG. 9 depicts an example of a process in accordance with some exemplary embodiments described herein.

FIG. 9 depicts an example process 900 for single channel full duplex wireless communications. The description of FIG. 9 also refers to FIGS. 1, 2A, 3A, and 3B.

At 910, a first analog radio frequency signal may be received. The first analog radio frequency signal may include a signal of interest and an interference signal caused by a second analog radio frequency signal transmitted in full duplex over the channel from which the first analog radio frequency signal is received. For example, receiver 112 may receive a first analog radio frequency signal including a signal of interest (e.g., a signal transmitted by another device, such as for example a radio, cell phone, base station, Wi-Fi wireless access point, back-haul point-to-point links, and the like). The first analog radio frequency signal may also include an interference signal (which is also referred to herein as the self-interference signal). This interference signal may be caused by transmissions from at least one of transmitters 110A-B, which are subsequently carried by a single frequency channel and then received by receiver 112. Because the transmissions and receptions are full duplex and occur over the channel, the receiver 112 receives the self-interference signal along with the signal of interest.

At 915, at least one of the first analog radio frequency signal and a portion of the second analog radio frequency signal may be adjusted in phase (e.g., delayed, offset, etc.) and/or attenuation to enable at least one of a reduction or an elimination of the interference signal in an output analog radio frequency signal. For example, the adapter 195 may be tuned based on a parameter, such as a received signal strength indicator (RSSI) measured at the output 116C of the analog RF-based canceller 120. Moreover, the adapter 195 may adjust at least one of the phase and the amplitude, and the adjustment may be based on the measured RSSI using an optimization technique, such as for example gradient descent. Moreover, the signal being adjusted which forms the cancellation signal used in the cancellation below may be the first analog radio frequency signal and/or the portion of the second analog radio frequency signal. If the first analog radio frequency signal is offset prior to the combining described below, the offset the first analog radio frequency signal may be considered a cancellation signal, and if the portion of the second analog radio frequency is offset prior to the combining described below, the offset portion of the second analog radio frequency signal may be considered a cancellation signal.

At 920, the received first analog radio frequency signal and a portion of the second analog radio frequency signal may be combined to generate an output analog radio frequency signal. This output analog radio frequency signal may be characterized by at least a reduction, or an elimination of, the self-interference signal caused by the reception at 112 of the second analog radio frequency signal. For example, the analog RF-based canceller 120 may include a first input 116A having a portion of the transmit signal 102 and a second input 116B having the received signal 104 and combine these signals (or adjusted versions of these signals) to generate the output analog radio frequency signal at 116C. For example, if the first analog radio frequency signal is offset to form a cancellation signal, the cancellation signal is combined with the portion of the second analog radio frequency to form the output analog radio frequency signal. On the other hand, if the portion of the second analog radio frequency is offset to form a cancellation signal, the cancellation signal is combined with the first analog radio frequency to form output analog radio frequency signal.

At 930, the output analog radio frequency signal may be provided as an output. For example, the analog RF-based canceller 120 may provide an output 116C characterized by a reduction, or an elimination of, the self-interference. The output 116C may be provided to additional components for processing. For example, output 116C may be processed by digital canceller 130. Moreover, in some implementations, the antennas may be positioned to enable antenna placement-based cancellation as described above. When this is the case, the received signal at 104 may include a self-interference signal reduced by placing the antennas of transmitters 110A-B and receiver 112 in locations that cause destructive interference of the signals transmitted by transmitters 110A-B.

Although the description above provided specific examples of the placement of antennas in order to cause cancellation, antenna placement cancellation may be implemented with different antenna configurations as well and still achieve self-interference reduction/elimination. For example, instead of using two transmit antennas and one receive antenna, the arrangement may be reversed with the same effect, e.g., one transmit antenna placed at a distance d from one receive antenna and distance d+λ/2 from another receive antenna. In this configuration, the receive signal may be attenuated for the first receive antenna by a certain value and then the two signals may be added using an RF combiner. Since this arrangement is the exact reciprocal of the two transmit antennas example noted above, the self-interference cancellation effect on the received signal is the same. Other arrangements of antennas are also possible for getting signal cancellation. Although the above description mentioned specific frequency bands, such as for example the 2.4 GHz frequency band, the subject matter described herein may be used at other frequencies as well.

In some implementations, the full duplex mechanisms described herein may be used in a variety of implementations. In some implementations, user equipment, base stations, base station-to-base station backhaul radios, point-to-point radios, Wi-Fi wireless access points, and wireless network access points may be configured in accordance with the duplex single channel mechanisms described with respect to systems 805 and 810, as well as systems 100, 200, 300, and 399.

For example, user equipment may be configured with the full duplex mechanisms described herein. The user equipment may be mobile and/or stationary. Moreover, the user equipment may be referred to as, for example, devices, mobile stations, mobile units, subscriber stations, wireless terminals, terminals, tablets, and/or any other device including wireless access. In some cases, the user equipment may include one or more of the following: at least one processor, at least one computer-readable storage medium (e.g., memory, storage, and the like), a user interface, and radio access mechanisms, and one or more mechanisms described herein.

The subject matter described herein may be embodied in a system, apparatus, method, and/or article depending on the desired configuration. For example, the system described herein and/or the processes described herein may be implemented using one or more of the following: at least one processor and at least one memory configured to allow the at least one processor to execute program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) may include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although the description herein refers to processes using minimums, maximums, and best values, the processes described herein may use other values as well, such as values about the minimum, values about the maximum, optimum values, and/or other appropriate values.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method for residually-tuned self-interference cancellation comprising:
converting a digital transmit signal of a communication system into a Radio Frequency (RF) transmit signal; wherein the RF transmit signal is an analog signal having a first center frequency; wherein the first center frequency is a radio frequency;
sampling the RF transmit signal;
transmitting, at a transmit antenna of the communication system, the RF transmit signal;
receiving, at a receive antenna of the communication system, an RF receive signal of the communication system; wherein the RF receive signal is an analog signal having a second center frequency; wherein the second center frequency is identical to the first center frequency;

transforming, in an RF domain and without performing frequency downconversion, the sampled RF transmit signal into an RF self-interference cancellation signal; wherein transforming the sampled RF transmit signal comprises:

attenuating, according to an attenuation setting of an adapter, the sampled RF transmit signal;

delaying, according to a delay setting of the adapter, the sampled RF transmit signal; and inverting the sampled RF transmit signal;

combining, over a wired cancellation path, in order to remove a first portion of self-interference from the RF receive signal, the RF self-interference cancellation signal with the RF receive signal, resulting in a reduced-interference RF receive signal;

sampling the reduced-interference RF receive signal; and modifying, using the adapter and according to a gradient descent algorithm, both of the attenuation setting and the delay setting in order to reduce a measured magnitude of the sampled reduced-interference RF receive signal.

2. The method of claim 1, wherein modifying, using the adapter and according to the gradient descent algorithm, both of the attenuation setting and the delay setting further comprises: identifying false positives occurring due to noisy minima and adapting the gradient descent algorithm to ignore the false positives.

3. The method of claim 1, further comprising:

sampling the digital transmit signal;

converting the reduced-interference RF receive signal into a reduced-interference digital receive signal;

transforming, in a digital domain, the sampled digital transmit signal into a digital self-interference cancellation signal; and combining, in order to remove a second portion of self-interference from the reduced-interference digital receive signal, the digital self-interference cancellation signal with the reduced-interference digital receive signal, resulting in a further-reduced-interference digital receive signal.

4. The method of claim 3, wherein transforming the sampled digital transmit signal comprises transforming the sampled digital transmit signal using a finite impulse response filter; wherein the finite impulse response filter is configured using a channel estimate.

5. The method of claim 4, further comprising iteratively calculating the channel estimate to reduce residual error.

6. The method of claim 5, further comprising sampling the further-reduced-interference digital receive signal; and modifying, using the adapter and according to a least squares algorithm, the channel estimate in order to reduce a measured magnitude of the sampled further-reduced-interference digital receive signal.

7. A method for self-interference cancellation comprising:

sampling a Radio Frequency (RF) transmit signal; wherein the RF transmit signal is an analog signal having a first center frequency; wherein the first center frequency is a radio frequency;

transmitting, at a transmit antenna of a communication system, the RF transmit signal;

receiving, at a receive antenna of the communication system, an RF receive signal of the communication system; wherein the RF receive signal is an analog signal having a second center frequency;

transforming, in an RF domain and without performing frequency downconversion, the sampled RF transmit signal into an RF self-interference cancellation signal; wherein transforming the sampled RF transmit signal comprises:

attenuating, according to an attenuation setting of an adapter, the sampled RF transmit signal;

delaying, according to a delay setting of the adapter, the sampled RF transmit signal; and inverting the sampled RF transmit signal;

combining, over a wired cancellation path, in order to remove a first portion of self-interference from the RF receive signal, the RF self-interference cancellation signal with the RF receive signal, resulting in a reduced-interference RF receive signal;

sampling the reduced-interference RF receive signal; and modifying, using the adapter, both of the attenuation setting and the delay setting in order to reduce a measured magnitude of the sampled reduced-interference RF receive signal.

8. The method of claim 7, wherein the transmit antenna is also the receive antenna.

9. The method of claim 7, further comprising:

sampling a digital transmit signal of the communication system;

converting the digital transmit signal into the RF transmit signal;

converting the reduced-interference RF receive signal into a reduced-interference digital receive signal;

transforming, in a digital domain, the sampled digital transmit signal into a digital self-interference cancellation signal using a digital finite impulse response filter; and combining, in order to remove a second portion of self-interference from the reduced-interference digital receive signal, the digital self-interference cancellation signal with the reduced-interference digital receive signal, resulting in a further-reduced-interference digital receive signal.

10. The method of claim 9, further comprising sampling the further-reduced-interference digital receive signal; and iteratively modifying, using the adapter, a configuration of the digital finite impulse response filter in order to reduce a measured magnitude of the sampled further-reduced-interference digital receive signal.

11. The method of claim 7, further comprising:

after sampling the RF transmit signal, converting the sampled RF transmit signal into an RF-sourced digital transmit signal;

transforming, in a digital domain, the RF-sourced digital transmit signal into a digital self-interference cancellation signal using a digital finite impulse response filter;

converting the reduced-interference RF receive signal into a reduced-interference digital receive signal; and combining, in order to remove a second portion of self-interference from the reduced-interference digital receive signal, the digital self-interference cancellation signal with the reduced-interference digital receive signal, resulting in a further-reduced-interference digital receive signal.

12. The method of claim 11, further comprising sampling the further-reduced-interference digital receive signal; and iteratively modifying, using the adapter, a configuration of the digital finite impulse response filter in order to reduce a measured magnitude of the further-reduced-interference digital receive signal.

13. A system for self-interference cancellation comprising:
   a transmitter, coupled to a transmit antenna, that transmits a Radio Frequency (RF) transmit signal having a first center frequency; wherein the first center frequency is a radio frequency;
   a signal splitter, communicatively coupled to the RF transmit signal, that samples the RF transmit signal to create a sampled RF transmit signal;
   a receiver, coupled to a receive antenna, that receives an RF receive signal having a second center frequency; wherein the second center frequency is a radio frequency;
   an RF self-interference canceller, coupled to the signal splitter, that transforms, in a RF domain and without performing frequency downconversion, the sampled RF transmit signal into an RF self-interference cancellation signal; wherein the RF self-interference canceller comprises a tunable attenuator, an inverter, a delayer, and a tunable phase shifter;
   a signal combiner, communicatively coupled to the RF self-interference cancellation signal and to the RF receive signal by wired signal paths, that combines the RF self-interference cancellation signal and the RF receive signal to produce a reduced-interference RF receive signal; wherein the reduced-interference RF receive signal is characterized by reduction of a first portion of self-interference relative to the RF receive signal;
   an adapter, communicatively coupled to the reduced-interference RF receive signal, that iteratively modifies settings of the tunable attenuator, the delayer, and the tunable phase shifter to reduce self-interference present in the reduced-interference RF receive signal.

14. The system of claim 13, wherein the transmitter creates the RF transmit signal from a digital transmit signal; wherein the receiver converts the reduced-interference RF receive signal into a reduced-interference digital receive signal; the system further comprising:
   a digital self interference canceller that:
      samples the digital transmit signal;
      transforms, in a digital domain, the sampled digital transmit signal into a digital self-interference cancellation signal using a configurable finite impulse response filter; and
      combines the digital self-interference cancellation signal and reduced-interference digital receive signal to produce a further-reduced-interference digital receive signal; wherein the further-reduced-interference digital receive signal is characterized by reduction of a second portion of self-interference relative to the RF receive signal.

15. The system of claim 14, wherein the adapter iteratively modifies a configuration of the configurable finite impulse response filter to reduce self-interference present in the further-reduced-interference digital receive signal.

16. The system of claim 15, wherein the adapter iteratively modifies the configuration of the configurable finite impulse response filter to reduce self-interference using a minimum mean squared error algorithm.

17. The system of claim 13, wherein the receiver converts the reduced-interference RF receive signal into a reduced-interference digital receive signal; the system further comprising:
   an analog-to-digital converter that converts the sampled RF transmit signal into an RF-sourced digital transmit signal;
   a digital self-interference canceller that:
      samples the RF-sourced digital transmit signal;
      transforms, in a digital domain, the sampled RF-sourced digital transmit signal into a digital self-interference cancellation signal using a configurable finite impulse response filter; and
      combines the digital self-interference cancellation signal and the reduced-interference digital receive signal to produce a further-reduced-interference digital receive signal; wherein the further-reduced-interference digital receive signal is characterized by reduction of a second portion of self-interference relative to the RF receive signal.

18. The system of claim 17, wherein the adapter iteratively modifies a configuration of the configurable finite impulse response filter to reduce self-interference present in the further-reduced-interference digital receive signal.

19. The system of claim 18, wherein the adapter iteratively modifies the configuration of the configurable finite impulse response filter to reduce self-interference using a minimum mean squared error algorithm.

\* \* \* \* \*